(12) United States Patent
Tietjen et al.

(10) Patent No.: US 7,952,513 B2
(45) Date of Patent: May 31, 2011

(54) COUNTER TARGET ACQUISITION RADAR AND ACOUSTIC ADJUNCT FOR CLASSIFICATION

(75) Inventors: Byron W. Tietjen, Baldwinsville, NY (US); Melinda M. Au, Fulton, NY (US); Craig A. Pomeroy, Syracuse, NY (US); Keith M. Lim, Liverpool, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 290 days.

(21) Appl. No.: 12/139,844

(22) Filed: Jun. 16, 2008

(65) Prior Publication Data
US 2009/0309781 A1 Dec. 17, 2009

(51) Int. Cl.
*G01S 13/00* (2006.01)
*G01S 13/08* (2006.01)

(52) U.S. Cl. ............ 342/52; 342/56; 342/118; 342/146; 342/147; 342/154

(58) Field of Classification Search ............ 342/27, 342/28, 52, 56, 118, 146, 147, 154, 157; 367/118–123, 136, 138
See application file for complete search history.

(56) References Cited

U.S. PATENT DOCUMENTS

| | | | |
|---|---|---|---|
| 3,781,782 A | 12/1973 | Scott et al. | |
| 3,844,175 A * | 10/1974 | Hixson | 73/647 |
| 3,952,300 A * | 4/1976 | Campbell | 342/52 |
| 4,925,129 A * | 5/1990 | Salkeld et al. | 244/3.11 |
| 5,168,473 A | 12/1992 | Parra | |
| 5,337,053 A * | 8/1994 | Dwyer | 342/90 |
| 5,371,502 A * | 12/1994 | Dittmann | 342/68 |
| 5,489,909 A * | 2/1996 | Dittmann et al. | 342/68 |
| 5,544,525 A * | 8/1996 | Peterman et al. | 73/170.13 |
| 5,781,505 A * | 7/1998 | Rowland | 367/127 |
| 5,808,967 A * | 9/1998 | Yu et al. | 367/91 |
| 5,828,334 A * | 10/1998 | Deegan | 342/90 |
| 6,211,811 B1 * | 4/2001 | Evers | 342/36 |
| 6,215,731 B1 * | 4/2001 | Smith | 367/128 |
| 6,239,740 B1 | 5/2001 | Collins et al. | |
| 6,327,221 B1 * | 12/2001 | Gualtieri | 367/138 |
| 6,575,400 B1 * | 6/2003 | Hopkins et al. | 244/3.19 |
| 6,621,764 B1 * | 9/2003 | Smith | 367/128 |
| 6,667,709 B1 * | 12/2003 | Hansen et al. | 342/22 |

(Continued)

OTHER PUBLICATIONS

International Search Report dated Mar. 8, 2010 for related PCT application No. PCT/US 09/47229.

(Continued)

*Primary Examiner* — Thomas H Tarcza
*Assistant Examiner* — Peter Bythrow
(74) *Attorney, Agent, or Firm* — Howard IP Law Group, P.C.

(57) ABSTRACT

A system for classifying targets utilizes radar receptions and acoustic signatures of armament projectiles (e.g., bullets from celebratory rifle fire, mortars, cannon fire, artillery shells, or rockets, etc.) to associate ordinances with radar returns to better utilize a radar's resources to acquire and track targets of interest. In one embodiment of the invention the system for classifying targets comprises: a radar system for detecting targets based upon radar receptions; an acoustic system for detecting targets based upon acoustic receptions; and a means for classifying the acoustic receptions into target types; a means for computing range, bearing and time of incidence for the radar receptions and the acoustic receptions; a means for associating the radar receptions and the acoustic receptions according to the classification.

34 Claims, 21 Drawing Sheets

U.S. PATENT DOCUMENTS

| | | | |
|---|---|---|---|
| 6,707,760 B1 * | 3/2004 | Coon et al. | 367/118 |
| 6,965,312 B2 * | 11/2005 | Lerg | 340/539.13 |
| 6,995,660 B2 * | 2/2006 | Yannone et al. | 340/425.5 |
| 7,030,905 B2 | 4/2006 | Carlbom et al. | 348/157 |
| 7,046,187 B2 * | 5/2006 | Fullerton et al. | 342/54 |
| 7,066,427 B2 * | 6/2006 | Chang | 244/3.19 |
| 7,104,496 B2 * | 9/2006 | Chang | 244/3.19 |
| 7,138,938 B1 * | 11/2006 | Prakah-Asante et al. | 342/70 |
| 7,415,117 B2 * | 8/2008 | Tashev et al. | 381/92 |
| 7,505,368 B2 * | 3/2009 | Hamilton | 367/137 |
| 7,567,200 B1 * | 7/2009 | Osterweil | 342/28 |
| 7,650,239 B2 * | 1/2010 | Samukawa et al. | 701/300 |
| 7,654,185 B1 * | 2/2010 | Yannone | 89/1.11 |
| 7,710,310 B2 * | 5/2010 | Huizing et al. | 342/52 |
| 2004/0061595 A1 | 4/2004 | Yannone et al. | |
| 2005/0001755 A1 | 1/2005 | Steadman et al. | |
| 2008/0140597 A1 | 6/2008 | Satir et al. | |

OTHER PUBLICATIONS

Ferguson, B.G., "Time-delay estimation techniques applied to the acoustic detection of jet aircraft transits", J. Acoust. Soc. Am., Jul. 1999, vol. 106, No. 1, pp. 255-264, Fig.4 and p. 257, col. 1, para (4) and p. 258, col. 1, para (2).

* cited by examiner

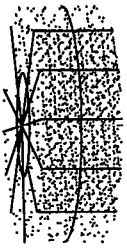

Gunfire Detection System (GDS)

- Functionality
  - Gunfire Detection
  - Relative Range
  - Azimuth Location
- Performance
  - <1 km Range for Gunfire
- Uses Muzzle Blast and Shockwave

*FIG. 3A*

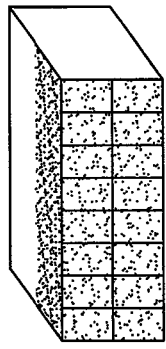

Shotgun Microphone Array

- Functionality
  - Shotgun
  - Directivity
  - Compact Design
- Performance
  - ~2-3 km Range for Gunfire, Mortars, Rocket Launches
  - Dynamic Range Limitation

*FIG. 3B*

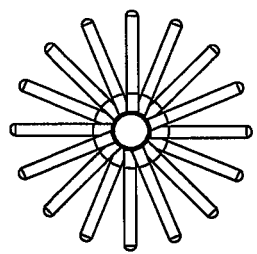

2x8 Element Array

- Functionality for Gunfire, Mortars, Rocket Launches
- Performance
  - ~5-11 km Range
- Array Length 1m

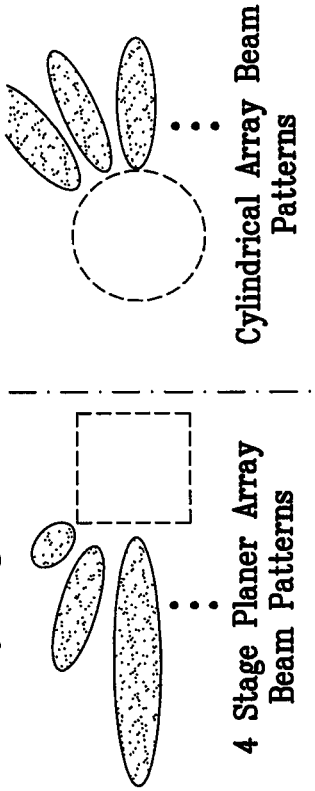

4 Stage Planer Array Beam Patterns

*FIG. 3C*

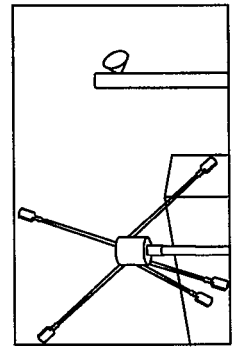

24x2 Element Cylindrical Array

- Functionality for Gunfire, Mortars, Rocket Launches
- Performance
  - ~5-11 km Range
  - Consistent Directivity for all 360 degrees
- Array Diameter 1m Cylindrical Array Beam Patterns

*FIG. 3D*

| Target Type | | Firearm | Firearm | Mortar | Artillery | Rocket |
|---|---|---|---|---|---|---|
| Target Source Level SL | | 150 | 165 | 150 | 170 | 190 |
| Array DI | DI | 21.55 | 21.55 | 21.55 | 21.55 | 21.55 |
| Aperture Loss | | 1.2 | 1.2 | 1.2 | 1.2 | 1.2 |
| Rx Spatial Sampling Loss | | 1.53 | 1.53 | 1.53 | 1.53 | 1.53 |
| Proc Loss | | 2.64 | 2.64 | 2.64 | 2.64 | 2.64 |
| 5 | km | 23.87 | 35.72 | 23.87 | 40.08 | 57.27 |
| Propagation Loss (5 dB/km) | PL | 23 | 34.5 | 23 | 38.5 | 55.4 |
| Noise Level | NL | 57 | 57 | 57 | 57 | 57 |
| Recognition Differential | RD | 12.6 | 12.6 | 12.6 | 12.6 | 12.6 |
| Signal Excess = | SE | 73.6 | 77.1 | 73.6 | 78.1 | 81.2 |
| Range (km) = | | 4.8 | 7.1 | 4.8 | 8.0 | 11.5 |
| Range (km) = | | 3.0 | 5.1 | 3.0 | 5.8 | 9.2 |

| Sonar Design | | c = | 343 | m/sec |
|---|---|---|---|---|
| | | = | 1125 | ft/sec |
| Design Freq = | 2 | kHz | Design Wavelength = | 0.5627 | ft |
| Operating Freq = | 2 | kHz | Operating Wavelength = | 0.5627 | ft |
| FOV Az = + | 24 | deg | | | |
| FOV El = + | 0.00 | deg | | | |
| REC'V ARRAY | | | Horiz. Array Gain at .5 lambda = | 9.0 | dB |
| #Columns = | 8 | | Horiz. Element Spacing = | 0.711 | λ |
| | 4.80 | in = | | 0.400 | ft |
| | 38.40 | in = | Array Width = | 3.200 | ft |
| Aperture Loss = | 0.60 | dB | Az. Beamwidth = | 11.78 | deg |
| | | | Az. DI = | 10.56 | dB |
| | | | Vert Array Gain at .5 lambda = | 3.01 | dB |
| #Rows = | 2 | | Vert Element Spacing = | 1.000 | λ |
| | 6.75 | in = | | 0.563 | ft |
| | 13.50 | in = | Array Height = | 1.13 | ft |
| Aperture Loss = | 0.60 | dB | El Beamwidth = | 29.39 | deg |
| Total Aperture Loss = | 1.200 | dB | El DI = | 6.02 | dB |
| | | | Array Physical Area = | 3.60 | ft² |
| | | | Array Gain at .5 lambda = | 12.04 | dB |
| | | | Unweighted DIr = | 21.55 | dB |
| | | | Weighted DIr = | 20.35 | dB |
| | | | Array Effective Area = | 2.73 | ft² |

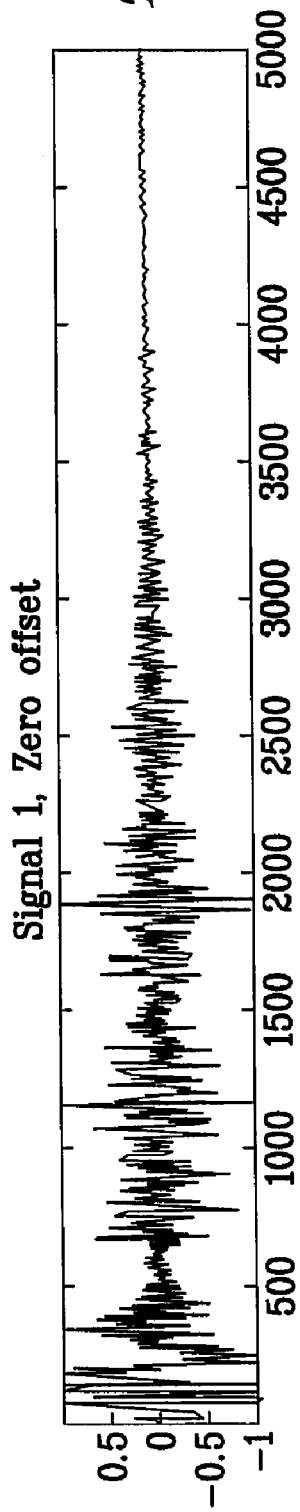
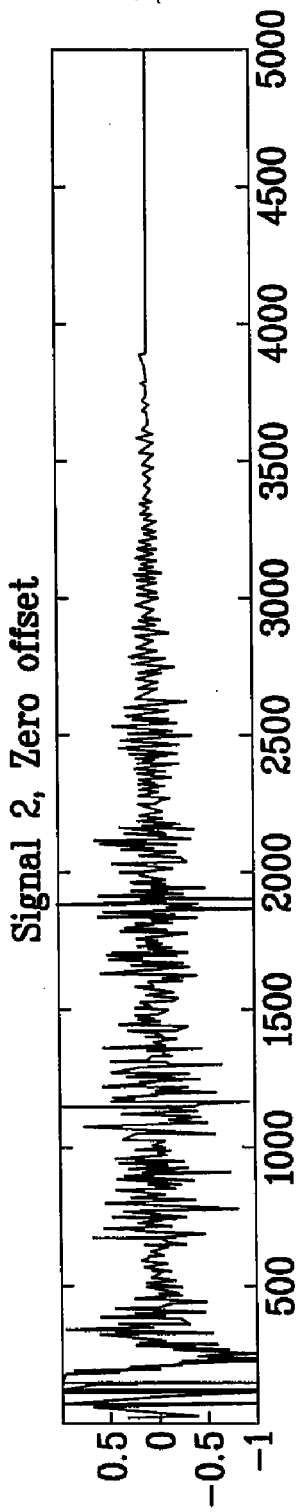
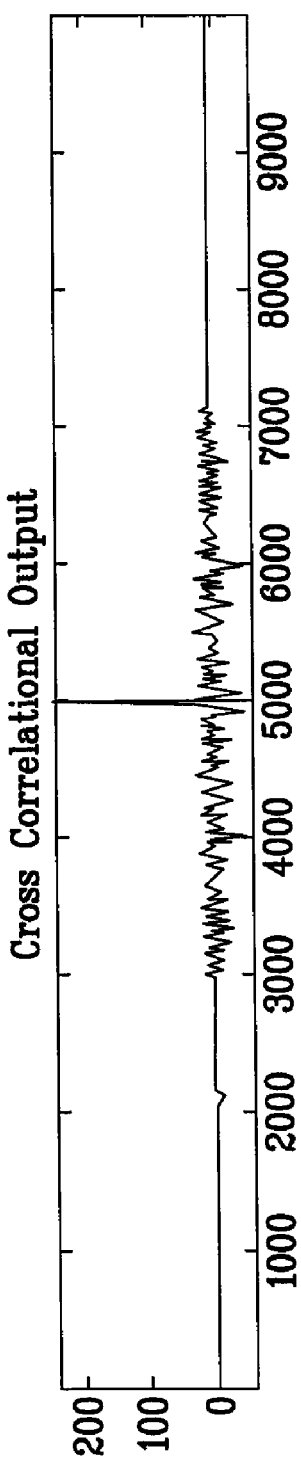
FIG. 8A
FIG. 8B
FIG. 8C

COUNTER TARGET ACQUISITION RADAR AND ACOUSTIC ADJUNCT FOR CLASSIFICATION

FIELD OF INVENTION

The present invention relates generally to radar systems and more specifically to a system and method for using acoustic receptions to improve the efficiency of counter target acquisition radar coverage and tracking.

BACKGROUND

The detection and tracking of a target object or objects is typically accomplished with radio detection and ranging, commonly known as radar. Radar systems typically emit electromagnetic energy and detect the reflection of that energy scattered by a target object. By analyzing the time difference of arrival, Doppler shift, and various other changes in the reflected energy, the location and movement of the target object can be calculated. A pulse based radar system scans a field of view and emits timed pulses of energy. Such radar systems, including, for example, counter target acquisition (CTA) type radar systems, can require both short range and long range target detection and tracking. Long range (e.g. on the order of 60 kilometers (Km) or more) detection performance requires relatively long pulse repetition intervals (PRI). A narrow beam is typically required for long range target detection and tracking.

A problem with the higher sensitivity of the CTA radar system is the enormous amount of data with which it has to contend. For example, celebratory friendly fire is often a problem because the projectiles such as the resulting bullet slugs are detectable by the radar (especially at short range), and since they are ballistic in nature, can often be difficult to distinguish from short range hostile projectiles. The classification of non-hostile targets is an issue because in order to resolve it, radar resources may have to be used to do so. There is a need, therefore, to classify a target as non-hostile as soon as possible so as to not expend valuable radar resources to do so, such as with celebratory gunfire. This is especially true for the shorter range targets, where radar resources tend to be more stressed. Therefore there is a need for classifying targets as to type (i.e., celebratory fire, mortars, cannon fire, artillery shells, or rockets, etc.) and using such classification to improve the efficiency of CTA radar.

SUMMARY OF THE INVENTION

According to an aspect of the present invention, a system for classifying targets utilizes radar receptions and acoustic signatures of armament projectiles (e.g., bullets from celebratory rifle fire, mortars, cannon fire, artillery shells, or rockets, etc.) to associate ordinances with radar returns to better utilize a radar's resources to acquire and track targets of interest. In one embodiment of the invention the system for classifying targets comprises: a radar system for detecting targets based upon radar receptions; detecting targets based upon acoustic receptions; and a means for classifying the acoustic receptions into target types; a means for computing range, bearing and time of incidence for the radar receptions and the acoustic receptions; a means for associating the radar receptions and the acoustic receptions according to the classification.

According to another aspect of the present invention a method for classifying targets comprises detecting targets based upon radar receptions; detecting targets based upon acoustic receptions; classifying the acoustic receptions into target types; computing range, bearing and time of incidence for the radar receptions and the acoustic receptions; associating the radar receptions and the acoustic receptions according to the classification.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts, and wherein:

FIGS. 3(a)-(d) are alternative acoustic sensors that may be utilized in accordance with the principles of the present invention.

FIG. 5a is a specification of various types of armament and their acoustical properties upon firing.

FIG. 6 are the parameters for an acoustic receiver array according to an embodiment of the present invention.

FIGS. 8a-8c are sample sound signatures used to correlate arrival time of sonic waves in accordance with the present invention.

DETAILED DESCRIPTION

It is to be understood that the figures and descriptions of the present invention have been simplified to illustrate elements that are relevant for a clear understanding, while eliminating, for the purpose of clarity, many other elements found in radar systems and methods of making and using the same. Those of ordinary skill in the art may recognize that other elements and/or steps may be desirable in implementing the present invention. However, because such elements and steps are well known in the art, and because they do not facilitate a better understanding of the present invention, a discussion of such elements and steps is not provided herein.

Figure 1:
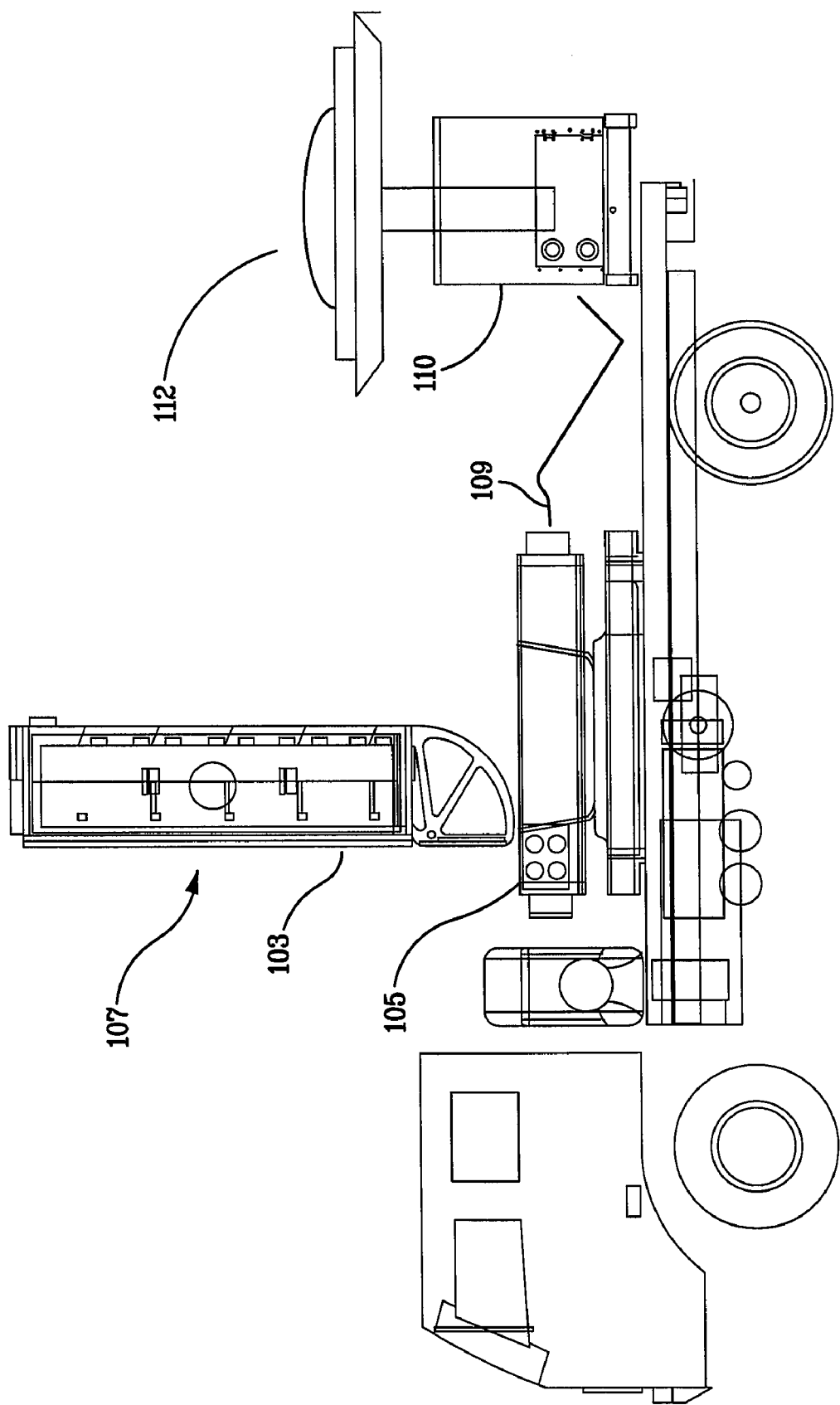
FIG. 1 is a side view of a vehicle transporting a CTA radar system and an integrated acoustic sensor system in accordance with an embodiment of the present invention.

As illustrated in FIG. 1 according to an aspect of the present invention, a radar system 105 utilizes input from an acoustic receiver system 110 in the form of acoustic signatures of armament projectiles (e.g., celebratory fire, mortars, cannon fire, artillery shells, or rockets, etc.) to classify and associate ordinances with radar returns to better utilize the radar system 105 resources to acquire and track targets of interest. The radar system 105 incorporates the acoustic system 110, which has a receiving aperture 112 to directionally receive sonic waves and convert them into electrical signals that are communicated via link 109 to the radar system 105 for further processing such as matching the sounds received with known acoustic signatures stored in a database (not shown).

For purposes of illustration only and not by way of limitation the radar system 105 uses a phase array antenna 103 having an aperture 107 with a rectangular array of m×n antenna elements typically arranged in rows and columns. The antenna's elements are each associated with respective transmit/receive (T/R) modules (not shown). Such radiating elements may be dipoles, monopoles, and/or other such radiators as is understood in the art. Each T/R module or element provides the active transmit/receive electronics required to operate the antenna element in transmit and receive mode. In an exemplary embodiment, each T/R module comprises a circulator coupled to a variable attenuator or amplitude shifter via low noise receive amplifier. A phase shifter may be switchably coupled via a T/R switch to transmit to a high power amplifier or to a variable attenuator for operation in either a transmit or receive mode of operation. It is understood that such a radar system is known in the art. Many such radar systems are known, including for example, the system as depicted in U.S. Pat. No. 6,084,540, entitled "Determination of Jammer Directions Using Multiple Antenna Beam Patterns" assigned to Lockheed Martin Corporation, the assignee herein, the subject matter thereof incorporated herein by reference. Those skilled in the art know that the beam pattern of an array antenna can be controlled to produce one or more directed beams, which may be broad, or of the narrow band or "pencil" type. Since control of an array antenna does not involve moving any physical object, control of the beam direction can take place almost instantaneously. Consequently, multitudes of directional beams can be generated in sequence in a very short period of time. As an alternative, the antenna beam controls can be adjusted to simultaneously produce multiple directional beams.

Figure 2:
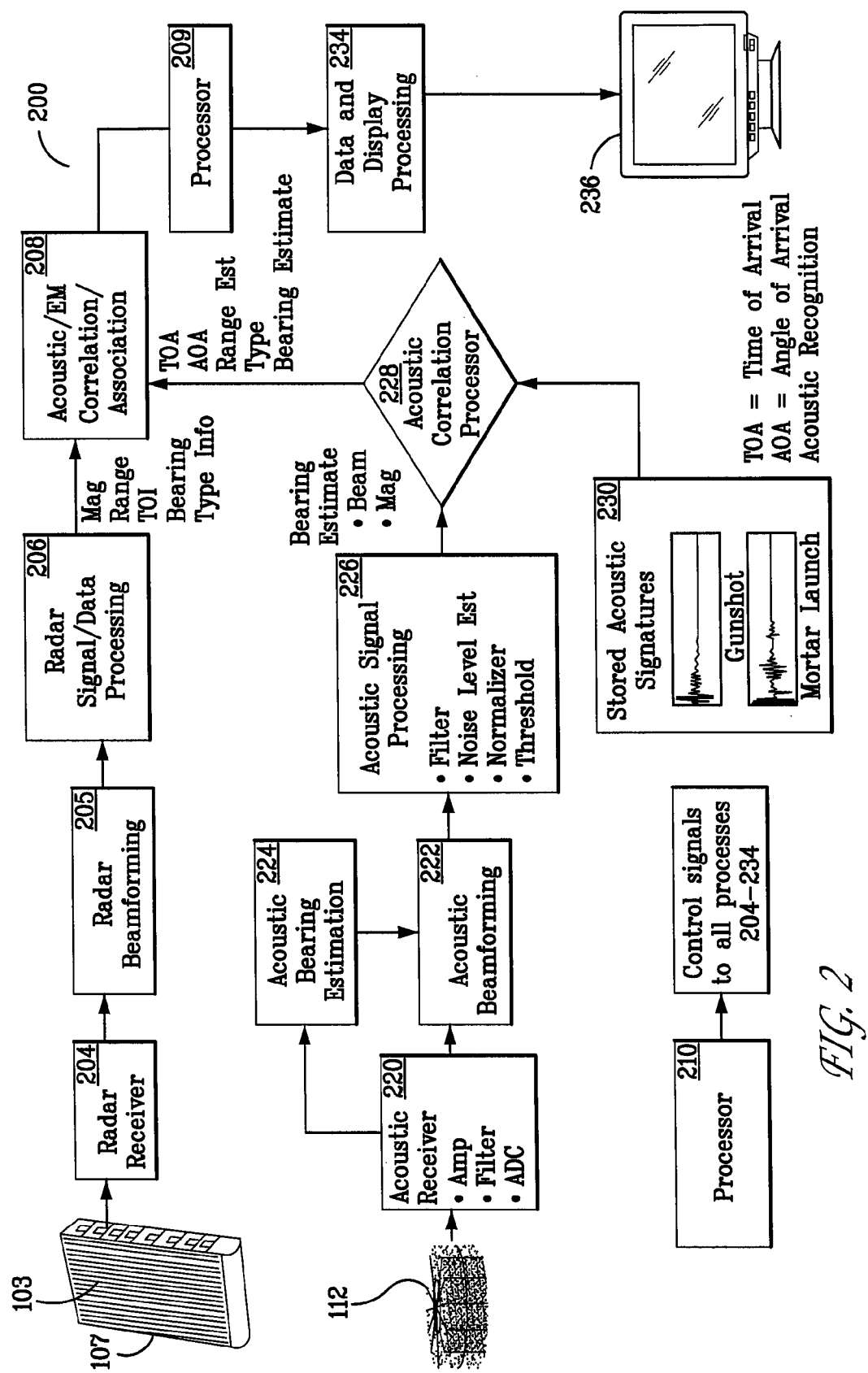
FIG. 2 is a block diagram of a system according to an embodiment of the present invention.

Referring now to FIG. 2, there is shown a block diagram of a system 200 according to an embodiment of the present invention. A system control function module 210 includes processor control logic for generating array control commands for controlling transmit and receive functions of T/R modules in the phased array antenna assembly 107 on a per-element basis and the receive functions of the acoustic system as well as other control signals to synchronize the operation of the various process functions as described below. For example, the control processor 210 serves to coordinate the full and half aperture modes by providing the appropriate control functions to the array elements and the transmit/receive processing. This will include the proper phase shifts to each element during transmit and receive when transmitting and receiving the full aperture (long range) pulse or sub-aperture (short range) pulse as is understood by those skilled in the art.

Still referring to FIG. 2, for receive beam processing reflected signal data is received and separately processed by receiver circuitry module 204 respectively. A beamformer 205 provides signal outputs from each radar sub-array as they are down converted via an RF downconverter arrangement, A/D converted into digital form, and applied separately to produce desired beams. The signals representing the various beams are applied to signal processor logic 206 which performs target signal detection and location processing, weight calculations (including, e.g. adaptive weight calculations), antenna nulling, and other signal processing of the received waveforms as is understood by those of ordinary skill in the art. Signal processor logic may be operatively coupled to one or more memory units (not shown) for storing, retrieving and processing array information including calibration data in the form of mutual coupling coefficients, dynamic range and SNR data, transmit power and received signal strength, for example.

The beamformer 205 and signal processor modules 206 may also include or be operatively coupled to signal detection circuitry and functionality for detecting and processing the transmitted/received signals, including detection of null conditions and threshold comparisons.

The output of signal processor module 206 is fed into an acoustic correlation association module 208 that classifies a target dependent upon radar and acoustic inputs. Targets properly classified may be processed in module 234 for a display 236 used for projecting the location of targets.

The beamformer 205 in general provides for the application of phase shifts to each element (via phase shifters), and then sums the result. Further filtering and analog to digital (A/D) conversion may also be included. The signal processor will operate on this digital data to further filter the signal as needed, perform pulse compression, Doppler filtering, magnitude detection, and thresholding for target detection as is well known to those skilled in the art. A data processor 209 coupled to the acoustic correlation association module 208 uses target detection data that has been passed on by the acoustic correlation association module 208 to form trackers, which track the targets and determine target characteristics, such as trajectory, and launch and/or impact points as well as determining which targets to display.

Referring again to FIG. 2, there is also shown a block diagram of an exemplary acoustic processing system having the acoustic aperture 112 and a receiver 220 for receiving sonic wave input. The receiver 220 includes one or more sensors that convert the acoustic wavefront into an analog signal. The received analog signal from receiver 220 is amplified, filtered and converted to a digital signal via an analog to digital converter (ADC). The digital signal is then processed through an acoustic beamformer 222. The beamformer 222 generally provides for the application of phase shifts to each element of the acoustic aperture 112 (via phase shifters), and then sums the result. An acoustic bearing estimation 224 provides a signal representing the direction from which a sonic wave is received by the acoustic sensors in receiver 220.

The signal processor 226 operates on this digital data to further filter the signal as needed, perform pulse compression, Doppler filtering, magnitude detection, and a threshold for sonic target detection as is well known to those skilled in the art of electronic signal processing. A signal processor 226 provides an output for a received sonic signal in the form of a bearing estimate, a beam magnitude and phase. The magnitude and phase are correlated in an acoustic correlation process module 228 which uses previously stored acoustic signatures resident in database 230.

FIGS. 3(a)-(d) are alternative acoustic apertures 112 that may be utilized in accordance with the principles of the according to one or more embodiments of the present invention. Each of the alternative acoustic apertures may be employed depending on the specific application (functionality, performance) as indicated by way of example in FIG. 3.

Figure 4A:
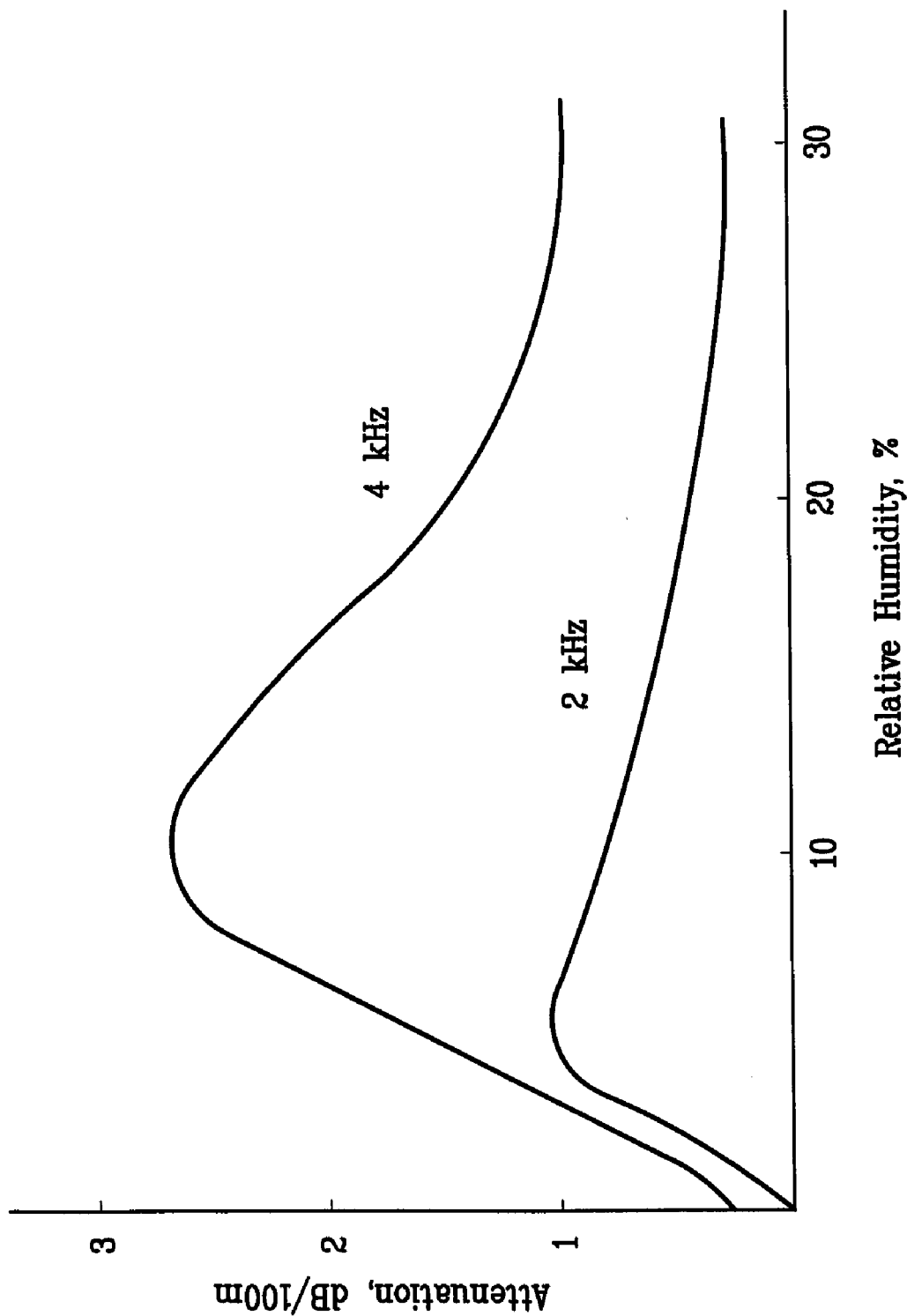
FIG. 4a is a graph of the attenuation of sound in air for two frequencies as a function of relative humidity.
Figure 4B:
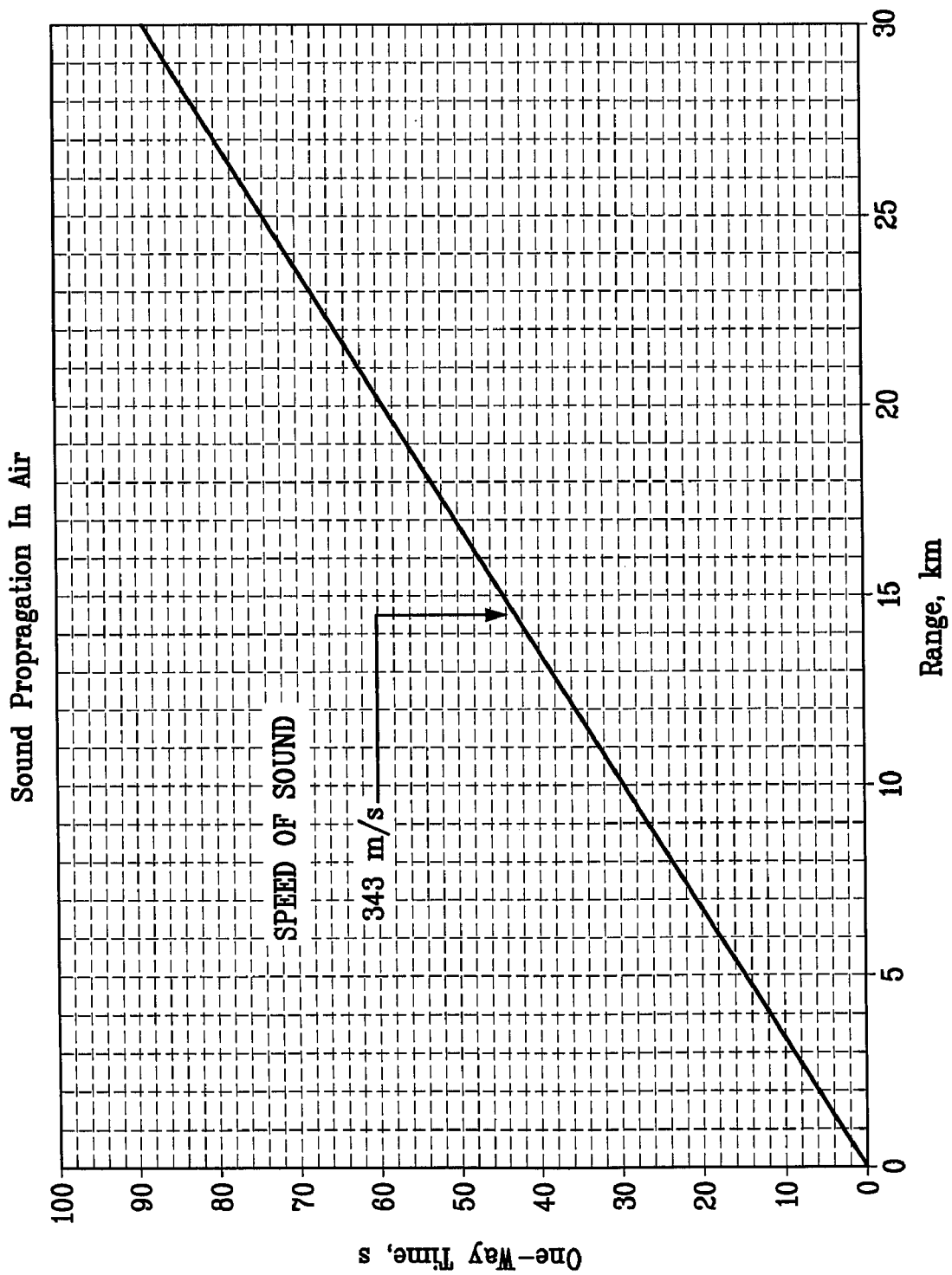
FIG. 4b is a graph of the propagation of sound in air.

Certain factors such as air density and humidity will influence the speed of sound in air. FIG. 4a shows the attenuation of sound per 100 meters distance from the source for two frequencies (2 kHz and 4 kHz) in an atmosphere having levels of relative humidity from 0 to 30%. The physical factors associated with the speed of sound will therefore affect the transmission of sound for various types of armaments. FIG. 4b shows a graph of the propagation of sound in air. As will be further described below, the range measured from the origin of a target to the acoustic aperture 112 is estimated by marking the time of arrival or TOA of a corresponding radar detection to essentially establish time zero and then utilizing the relationship between the propagation of sound in air and the distance traveled as described in FIG. 4b.

Detection ranges for sonic waves emanating several kilometers from the acoustic sensor are possible depending on background noise levels and other factors such as propagation loss, which is dependent on the humidity and the distance traveled by sound from its origin. The table in FIG. 5a illustrates the detection of various types of armament depending on background noise and other factors such as propagation loss. Certain factors are relevant to a determination of signal strength. By way of example, the following may be deemed relevant: SL a particular sound source, RD a recognition differential (in the example shown to be equal between various ordinances), NL a noise level, a directivity index DI and a propagation loss PL.

An excess signal is required at the sensor receiver 112 so as the signal is detectable and useable. The signal excess is computed as follows:

$$SE = SL - RD - NL + DI - PL$$

Where SE is the signal excess, SL is a sound source, RD a recognition, NL a noise level, a directivity index DI and a propagation loss PL.

Figure 5B:
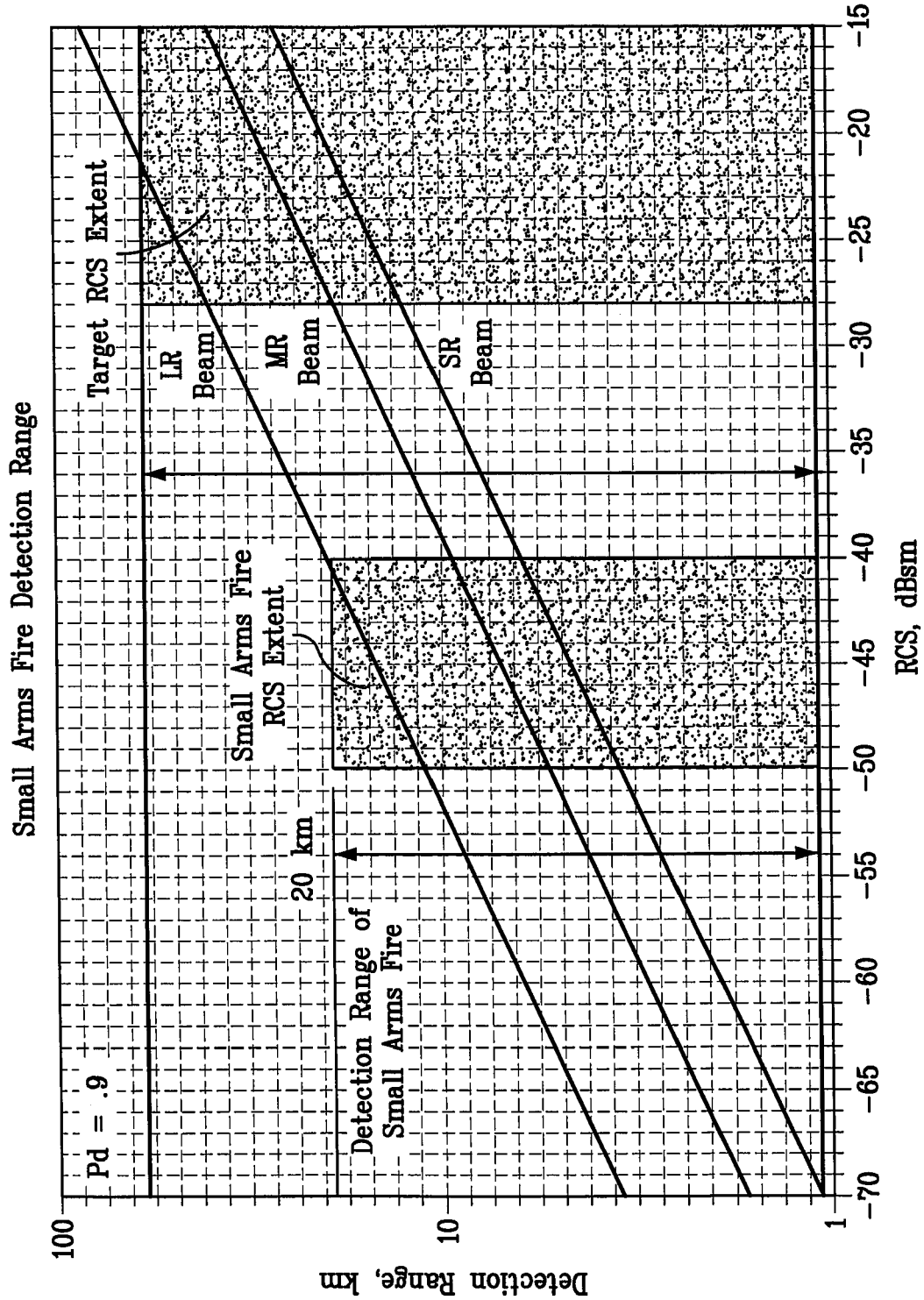
FIG. 5b is graph showing the 90% probability of detection of a target at various ranges.

FIG. 5b is graph showing the 90% probability of detection of a target at various ranges utilizing the radar system comprised of elements 103, 107, and 204 and a receiver aperture array 112 and corresponding receiver 220 (see, FIG. 2) under conditions illustrated in FIG. 4a and FIG. 4b. For detection of small arms a detection range of 20 km can be expected between the signal levels of −70 dBsm and −55 dBsm. The radar detects targets at ranges dependent on the short range, medium and long range beams of 1 km to 60 km for signal levels between −70 dBsm and −15 dBsm.

FIG. 6 is a design specification of the acoustic receiver array 112 depicted in FIG. 3c according to an embodiment of the present invention. The receiver aperture array 112 design is based upon a design frequency of 2 kHz and an operating frequency of 2 KHz having corresponding wavelengths of 0.5627 feet at the speed of sound. The design assumes a speed of sound "c" substantially that in air of 343 meters per second (1125 feet per second), (also see, FIG. 4b). The configuration of the array 112 provides for eight (8) columns and two (2) rows. The dimensions for each column (4.8×38.40 inches) and each row (6.75×13.50) has a corresponding total loss for the column and row of 0.60 dB.

Figure 7:
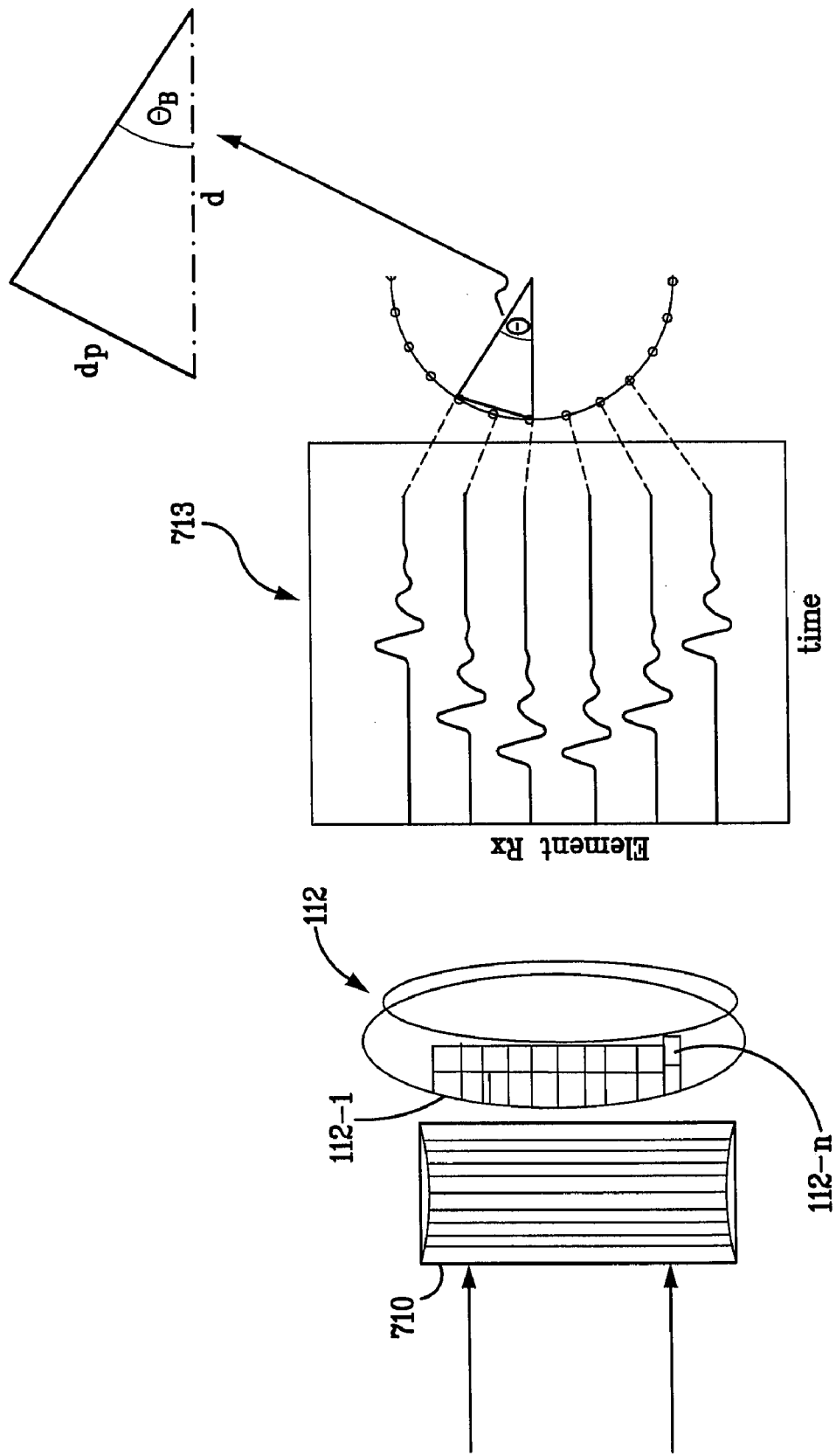
FIG. 7 illustrates a sonic wavefront and the geometric relationship used in the calculation of delay of a received sonic wave.

A design of the acoustic receiver array 112 depicted in FIG. 3d according to an embodiment of the present invention is used to describe the aspects of beamforming in module 222 (FIG. 2) and acoustic bearing estimation in module 224 (FIG. 2). Referring to FIG. 7 input from pairs of aperture elements 112-1 through 112-n are spatially separated. More particularly, as shown in waveshape 713 each phase of the sonic wavefront 710 arrives at each acoustic aperture 112 receiver element 112-1 through 112-n at a different time. The arrival time differences are related to the direction of the wavefront 710 to the circumferential location of the elements 112-1 through 112-n.

As previously indicated, the received acoustic signal is digitized and processed through the acoustic beamformer 222 to provide for phase shifts to each element of the acoustic aperture 112 via phase shifters. The process of summing a final received signal includes adding the bearing or direction from which a sonic wave is received by the acoustic aperture 112. This function is provided by the acoustic bearing estimation as supplied by acoustic bearing estimation 224. The acoustic bearing estimation 224 computes a signal lag based upon the acoustic aperture 112 receiver array geometry. With reference to FIG. 7 the arrival time differences related to the direction of the wavefront 710 may also be used to derive a bearing lag L the where difference in time reception among elements is converted to the difference in propagation path length:

$$d_p = v_s(L/F_s)$$

Where:
$d_p$ is the path length;
L is the time difference between receiver elements;
$F_s$ is the sampling rate frequency of the sonic wavefront;
$v_s$ is the velocity of the sonic wavefront.

The distance dp is used with pair separation d to calculate $\theta_B$: the angle of arrival (AOA):

$$\theta_B = \text{Arcsin } d_p/d$$

FIG. 8 shows a function performed by the correlation processor 228 (FIG. 2) to remove uncorrelated noise and highlight signals common to pairs of inputs from the circumferential elements 112-1 through 112-n. From the correlation output a peak location is determined and a difference of arrival time is derived. For signals of length N and signal Lag L, a peak occurs at an Index N−L. The correlation peak as shown in FIG. 8(c) is used to determine the time of arrival of the sonic wavefront 710 (FIG. 7). A peak occurs at the Index for a signal having a length N, sampled at a rate Fs. Within the correlation processor 228 module a time of arrival (TOA) is calculated as follows:

$$TOA = (\text{Index} - N)/Fs$$

Referring to FIG. 2, the correlation processor 228 also estimates the range from the origin of the target emitting a sonic wave to the receiver aperture 112 utilizing the received signal intensity sensed at receiver aperture 112 and a corresponding signal match stored in target database 230. The signal intensity falls off as the square of the distance from the source. The calculation or range using the spherical spreading loss (TL) proceeds as follows:

$$T_L = 20 \log_{10}(R)$$

$T_L = S_L - R_L$ $R = 10^{(S_L - R_L)/20}$

Figure 9:
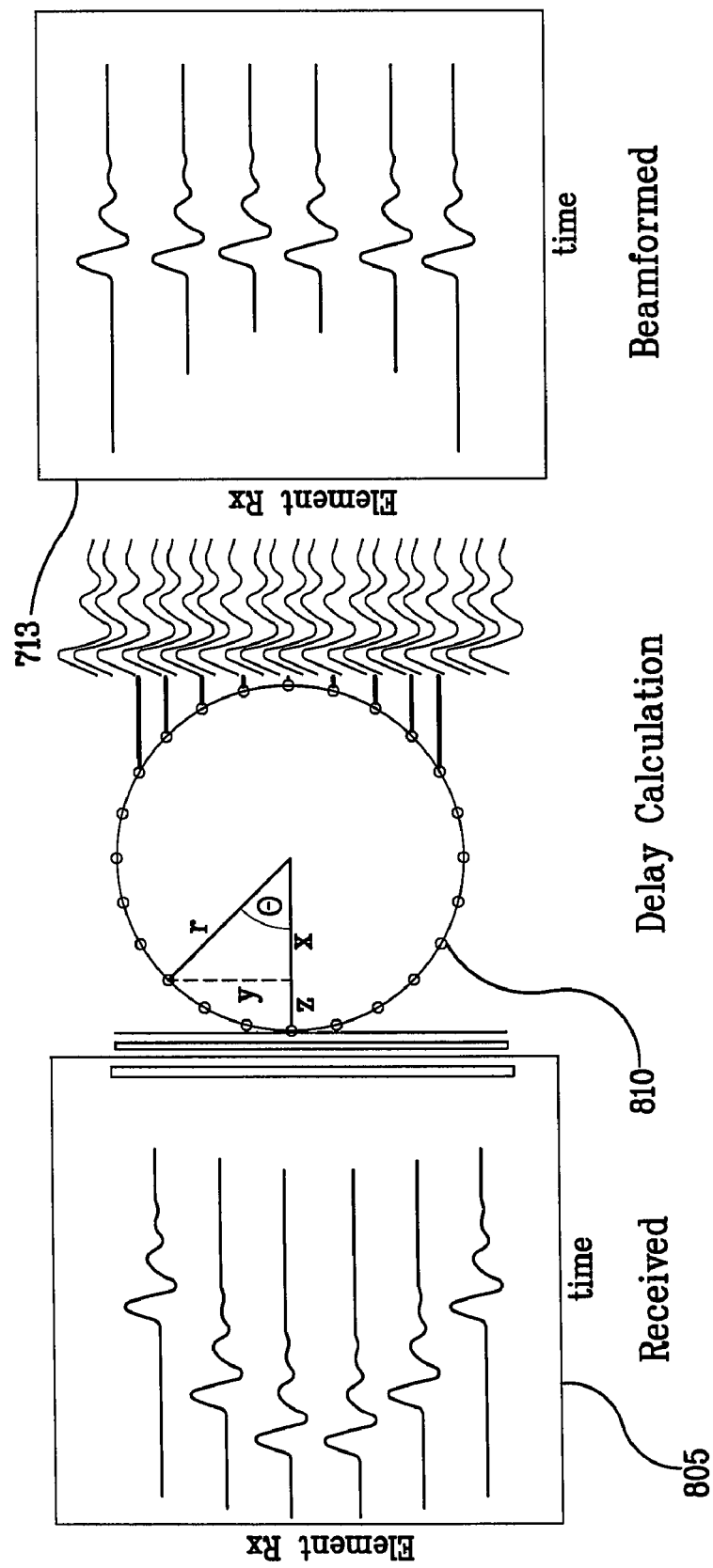
FIG. 9 illustrates a received sonic wave and its relation to a beamforming apparatus in accordance with an embodiment of the present invention.
Figure 10:
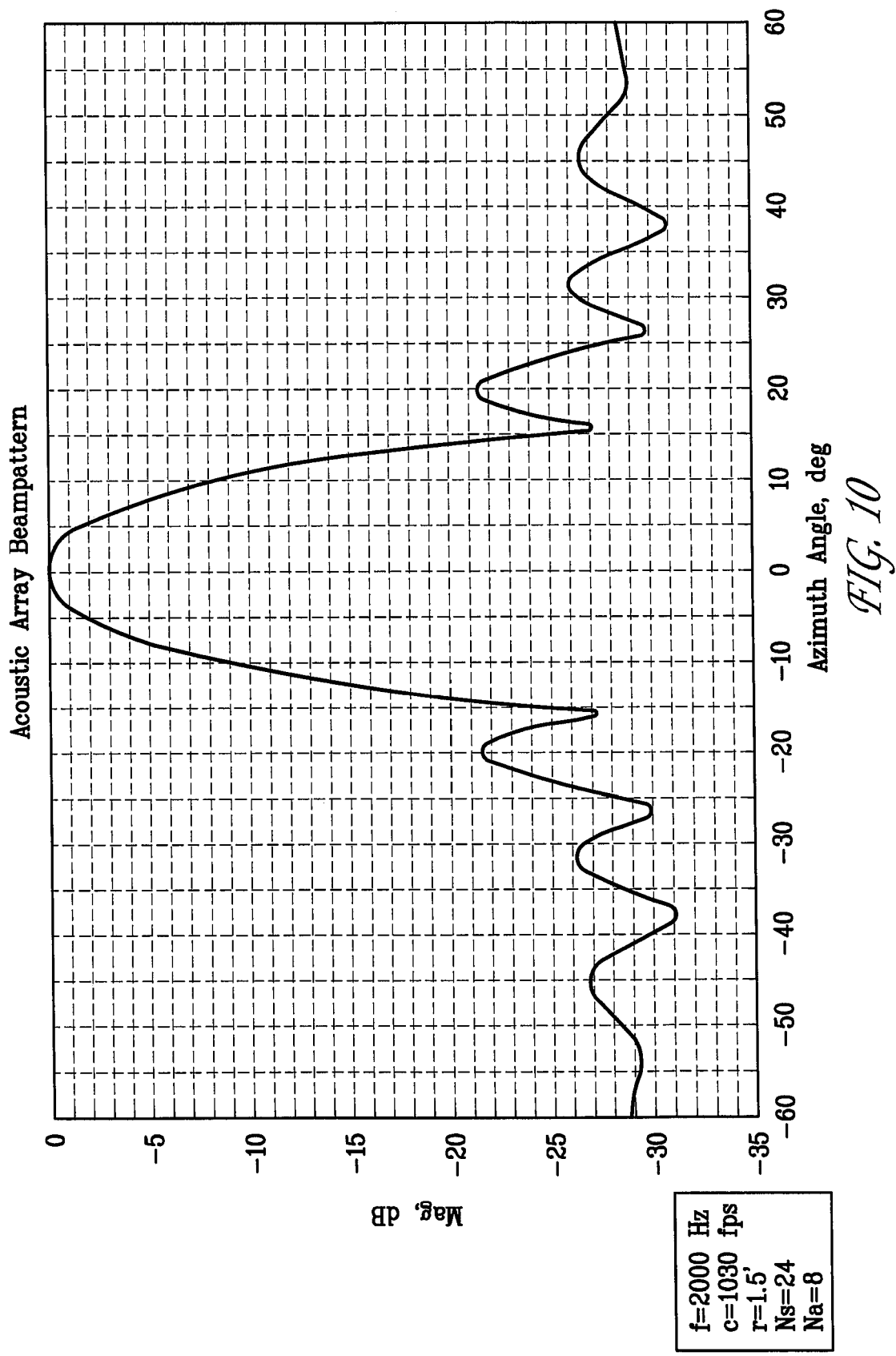
FIG. 10 illustrates a beam power spectrum in accordance with an embodiment of the present invention.

The specification illustrated in FIG. 6 for the aperture array configuration in FIG. 3c showing eight (24) columns and two (2) rows produces the acoustic array beam pattern shown in FIG. 10 for a 2 KHZ sonic wave traveling at 1030 feet per second. The beamformer 222 reforms the beam pattern for use in connection with processing the acoustic receptions. Additionally, the beamformer 222 improves directivity, signal to noise ratio and target detection. As previously explained in connection with FIG. 7, and now in connection with FIG. 9, the intersection of the plane wave incoming sonic wavefront 805 with the curvature of the receiver causes each phase to arrive at each acoustic aperture element 112-1 through 112-n at a different time, whereby some portion of the wavefront is delayed as a function of the radius of curvature of the receiver array. To form a beam the delay in reception is time-shifted as illustrated in FIG. 9 to realign the wavefront for constructive interference. With reference to FIG. 9 the time delay calculation in reference to the sector 810 is made within the beamformer module 222 or optionally within the acoustic signal processing module 226 as follows:

$\cos(\theta) = x/r$ therefore, $z = r - r^* \cos(\theta)$ $\Delta t = z/c$ $SD = \Delta t^* F_s$ Where:
C is the velocity of sound in air;
SD is the sample delay;
$F_s$ is the sampling rate frequency of the sonic wavefront chosen sufficient high to achieve necessary resolution;
$\Delta t$ is the time delay.

Within the beamformer 222, in addition to adjustments made to the beamformed signal for directionality provided by the acoustic bearing estimation 224 an amplitude taper in accordance with a Taylor function, a well known biasing method to those skilled in the art of antenna design, is applied to the time shifted wavefront signal to improve sidelobe performance.

Referring again to FIG. 2 database 230 stores signatures for types of armament such as bullets from celebratory rifle fire, mortars, cannon fire, artillery shells, or rockets, etc. and various salient parameters for each of the signatures such as time of arrival and angle of arrival. The database 230 is accessed via correlation means 228 upon a reception of a potential target and used to determine if the potential target is in the database 230.

Figure 11:
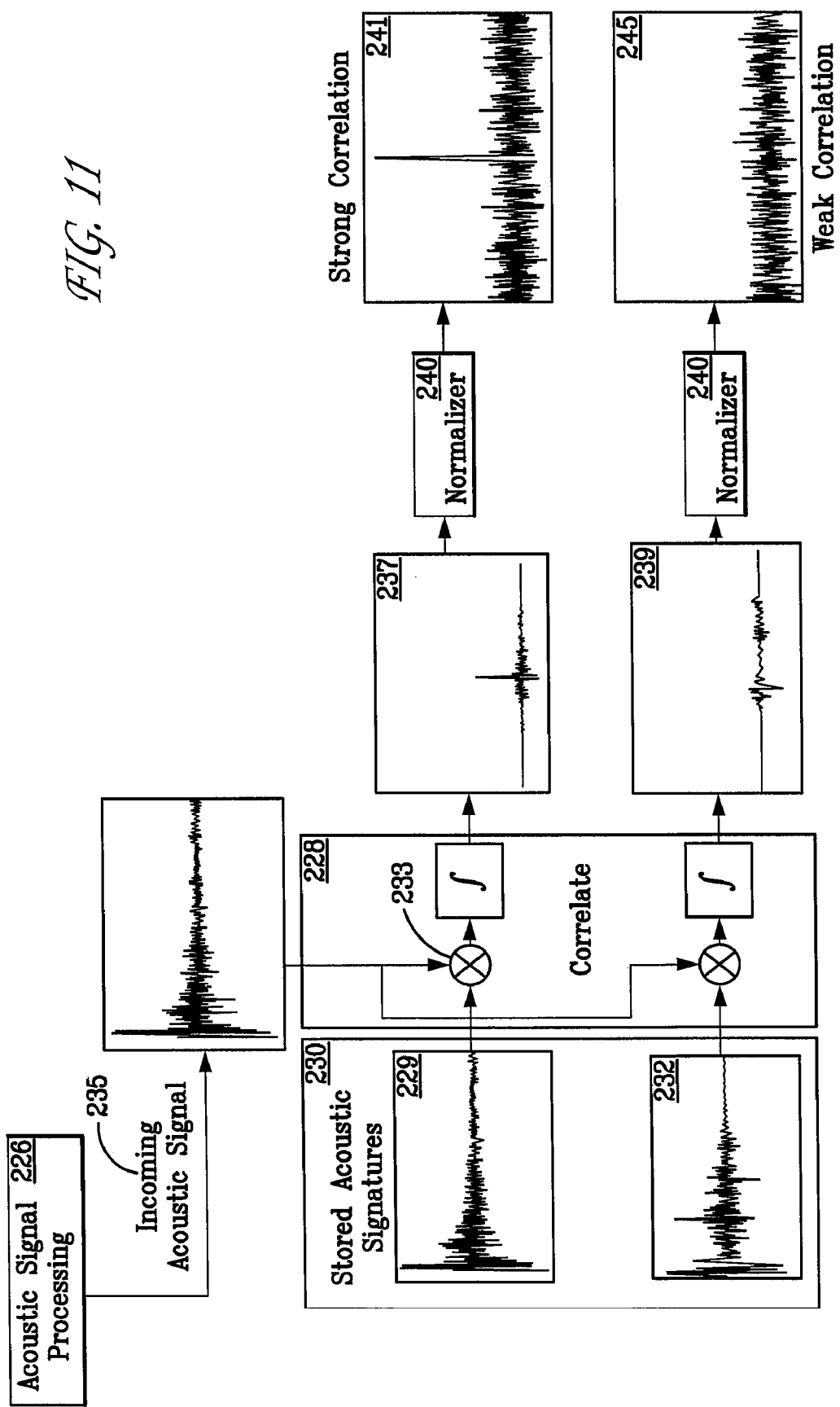
FIG. 11 is an illustration of the process of correlating the sound of a gunshot according to an embodiment of the present invention.

FIG. 11 shows an example of an incoming gunshot acoustic signal 235 that serves as one input to correlation means 228. The correlation means performs a correlation 233 on signal 235 and acoustic signature 229 and acoustic signature 232 stored in the database 230 to determine if the stored acoustic signatures can be identified with the particular incoming acoustic signal 235. The correlation means uses mathematical processes well known to those of ordinary skill in the electrical engineering. In the example shown a correlation 237 exists between the incoming signal 235 and the stored acoustic signature 229. However, a correlation does not exist with stored acoustic signature 232 as shown by result 239 between the incoming signal 235 and the stored acoustic signature 232. Following a normalization 240 of the correlation results it is further confirmed that stored acoustic signature 229 provides a strong correlation 241 with the incoming acoustic signal 235 and that acoustic signature 232 provides a weak correlation 243 with the incoming acoustic signal 235.

Figure 12:
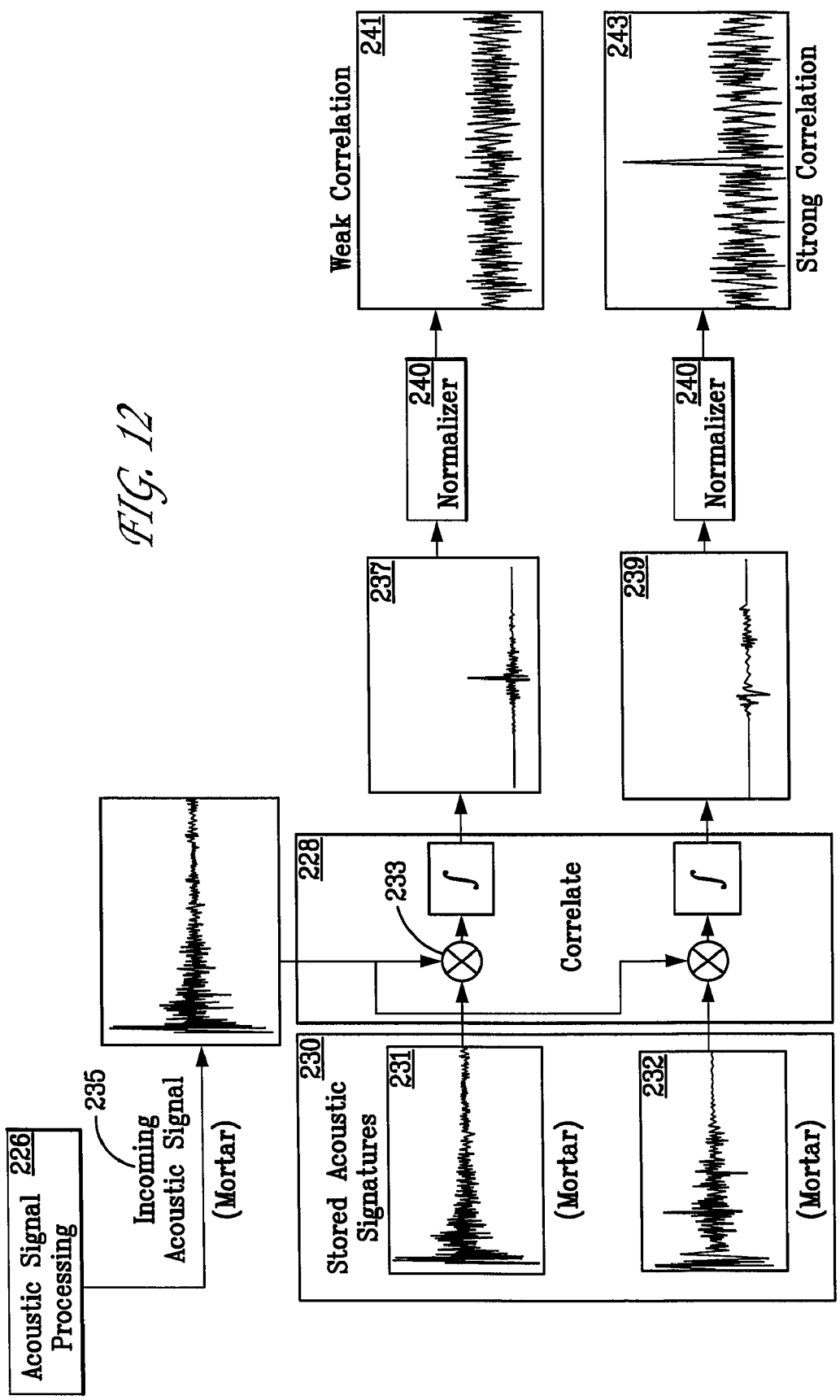
FIG. 12 is an illustration of the process of correlating the sound of a mortar according to an embodiment of the present invention.

FIG. 12 shows an example of an incoming mortar acoustic signal 235 that serves as one input to correlation means 228. In this example a correlation 241 exists between the incoming mortar signal 235 and the stored acoustic signature 231. However, a correlation does not exist as shown by result 243 between the incoming signal 235 and the second stored mortar acoustic signature 232.

Figure 13:
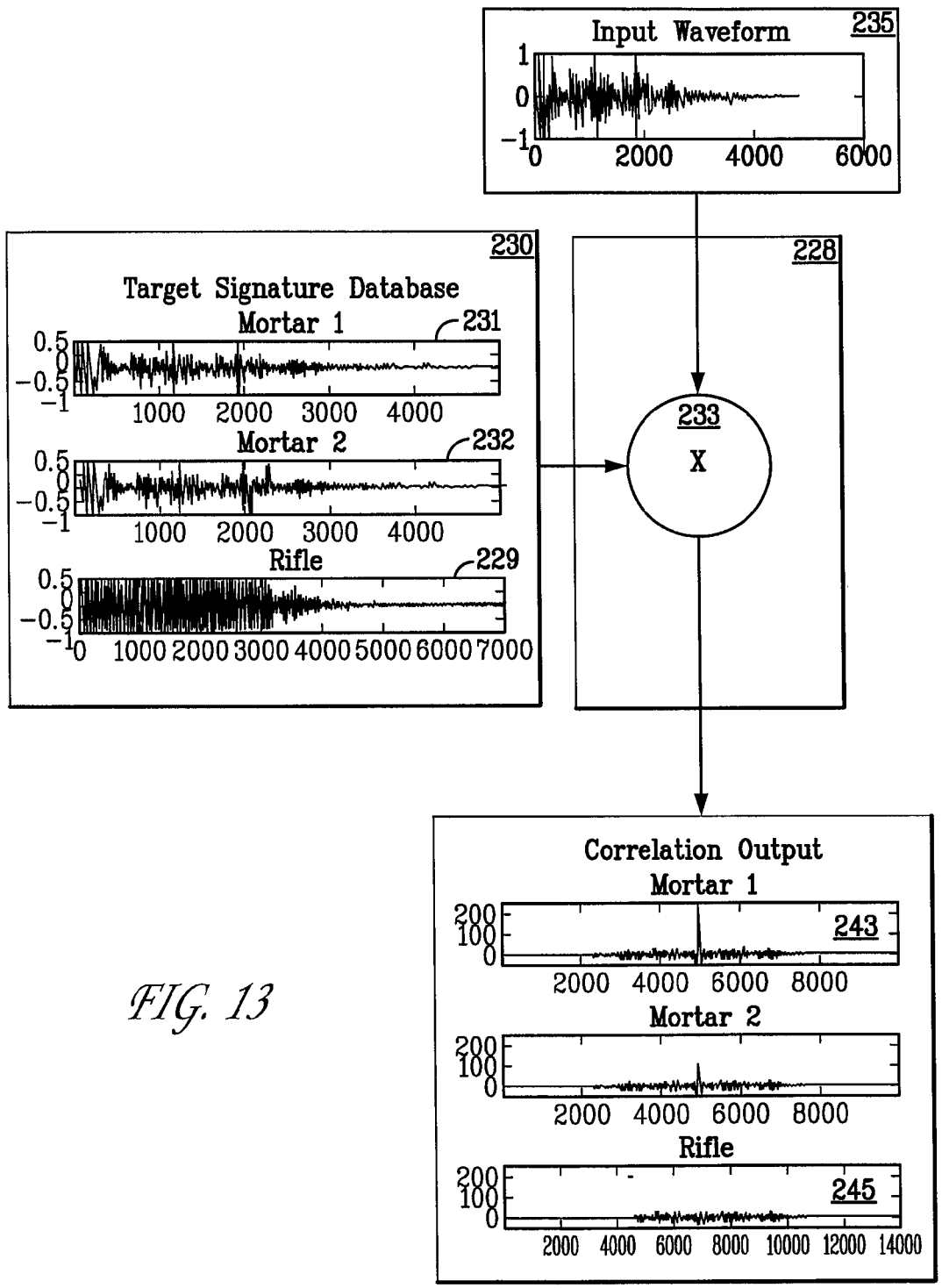
FIG. 13 is an illustration of the process of correlating the sounds of a gunshot and mortar to discriminate various types of armament according to an embodiment of the present invention.

FIG. 13 shows another example of an incoming acoustic signal 235 that serves as one input to the correlation means 228. In this example two mortar signals (mortar 1 231, mortar 2 232) stored in database 230 and one rifle signal 229 stored in database 230 serve as inputs to the correlation means 228 to determine if there is a match between the stored signals and the incoming signal 235. The figure illustrates that only mortar 1 stored signal 243 correlates with the incoming signal 235.

Figure 14:
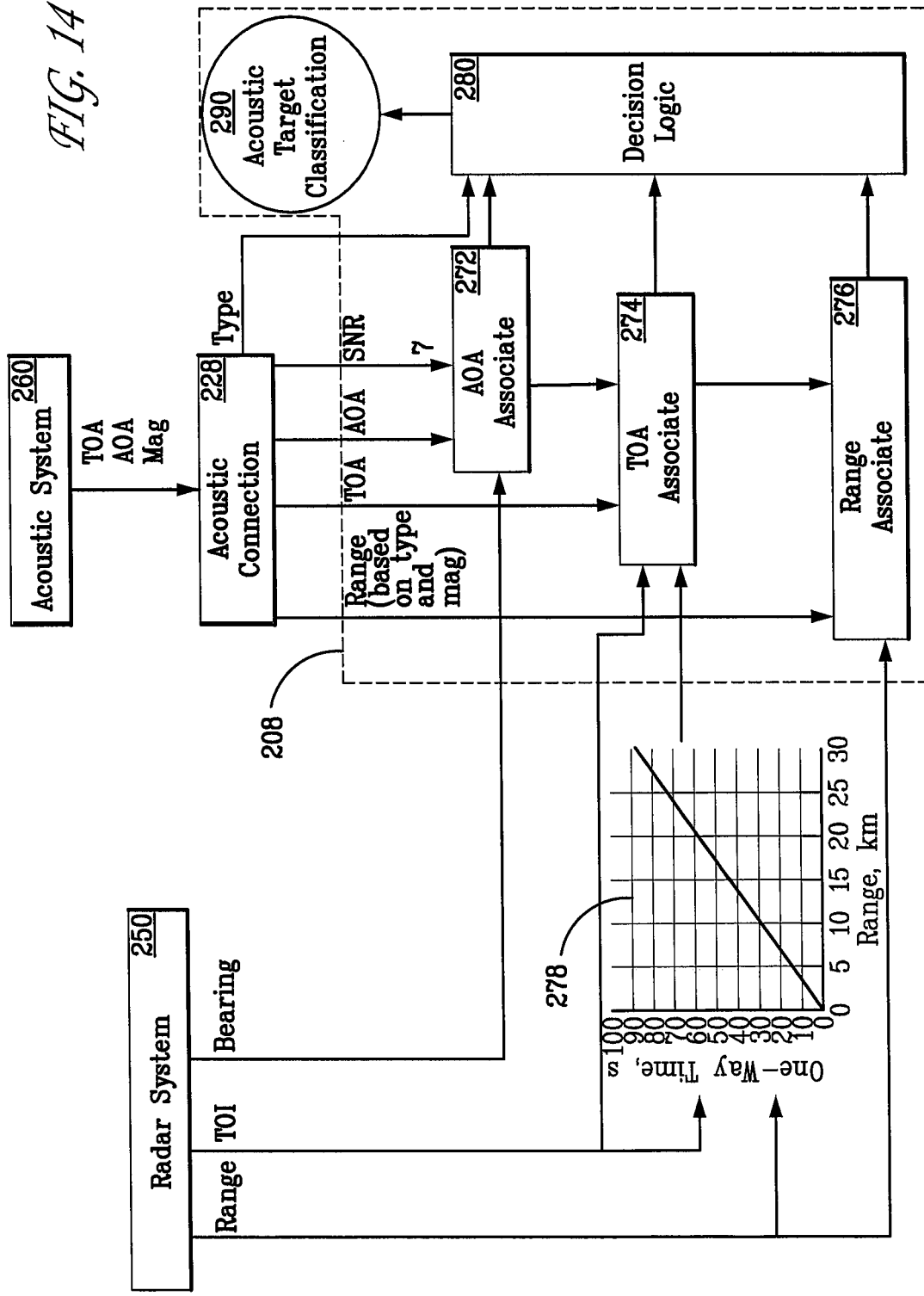
FIG. 14 is a block diagram of the correlation association process according to an embodiment of the present invention.

The output of the correlation means 228, as well as data as determined via processing within the beamformer 222, acoustic bearing estimation 224 and the acoustic signal processing 226 module, serve as input to an acoustic correlation association module 208. As illustrated in FIG. 14, the radar system 250, previously described in FIG. 2, blocks 103, 107, 204, 205, and 205 serve to supply radar inputs such as magnitude, range, time of interception and bearing to the acoustic correlation association module 208. The acoustic system 250 previously described in FIG. 2, blocks 112, 220, 222, and 226 serve to supply acoustic inputs such as time of arrival (TOA), angle of arrival (AOA), signal to noise ratio (SNR) and range based upon type of target and magnitude to the acoustic correlation association module 208.

The range (from the origin of target to the acoustic aperture 112) of a target detected acoustically is computed by marking the time of arrival or TOA of a corresponding radar detection, to essentially establish time zero and utilizing the relationship between the propagation of sound in air and distance traveled as described in FIG. 4b and also depicted in FIG. 14, graph 278.

In determining targets of interest only those within a window of time associated with the range and the bearing calculations are used. The acoustic correlation module 228 utilizes the SNR of a received acoustic signal as a metric to determine a window of time associated with range and bearing calculations.

Figure 15:
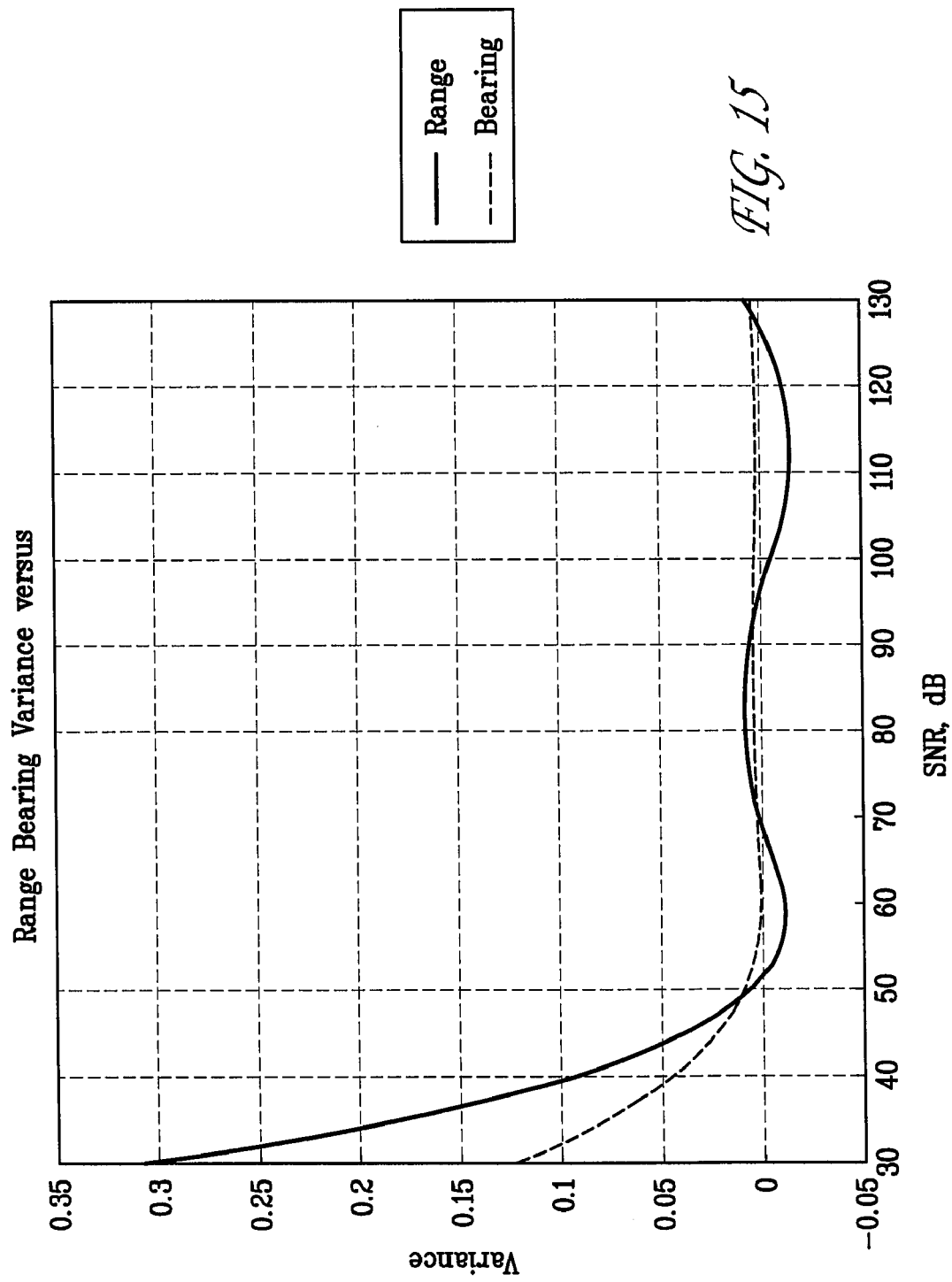
FIG. 15 are plots of the variance and signal to noise ratio (SNR) for range and bearing as detected by an acoustic system in accordance with the present invention.

FIG. 15 plots the variance in the range and the bearing as a function of the SNR in the received acoustic signal. To calculate B_Range ($B_R$) and B_Bearing ($B_B$), the acoustic correlation association module 208 uses a database (not shown) that contains the values depicted the graph shown in FIG. 15. The SNR value is used to determine the standard deviation for range and bearing respectively.

By way of example and not limitation, if a target has a Range of 1 km and a SNR value 40 dB, the variance is 0.1. The standard deviation is a value of $\sqrt{(0.1)}$. The process adds plus or minus three standard deviations to the range to get an allowable range window for later consideration as whether the radar detected target and the acoustically detected target might be associated. This process is repeated for bearing. By way of example and not limitation, if a target has a bearing is 20 degrees and has a SNR value 40 dB, the variance is 0.05. Since the standard deviation is the square root of the variance, the value for the variance 0.05 is $\sqrt{(0.05)}$. The process adds plus or minus three standard deviations to the bearing to get an allowable bearing window for later consideration as whether the radar detected target and the acoustically detected target might be associated.

The radar detected TOI is used to obtain a more accurate range measurement which is stored in a database (not shown) as (R(i,1)). The sound propagation constant (343 m/s) is used to determine the logical delay between when the acoustic aperture 112 in association with the receiver 220 would have detected the target compared to when the radar detected the target.

A probable time window $B_{TimeOfIncidence}$ ($B_T$) is calculated as follows:

$$B_T = TOI +/- R(i,1)1343 \text{ m/s}$$

Where:

$B_T$ is the window associated with the TOI from one detected target

R is the range associated with one detected target 343 m/s is the velocity of sound in the atmosphere at sea level.

Returning to FIG. 14, within the acoustic correlation association module 208 one or more modules process algorithms utilizing inputs from the radar system 250 and the acoustic system 260 to classify whether the target is a target for CTA consideration or a target in the class of celebratory fire, mortars, cannon fire, artillery shells, or rockets, etc, in which case the radar system, by way of example may ignore as a target. One or more algorithms are used to determine if a target is one having been detected by the acoustic system 260 and the radar system 250. In AOA associate module 272 the AOA and the SNR inputs from the acoustic correlation module 228 and bearing from the radar system 250 are used to provide algorithm data for range, bearing and the range time window and bearing time window. The acoustic correlation module 228 also provides TOA associate module 274 the TOA and the range based upon type target and its magnitude. The radar system 250 supplies the TOA associate module 274 range and TOI to provide additional data required by the algorithms to classify 290 the acoustic target. The acoustic correlation module 228 also provides range based upon type and magnitude to the range associate module 276. The radar system 250 supplies range also to provide additional data required by the algorithms to classify 290 the acoustic target. Decision logic 280 receives input from blocks 228, 272, 274, and 276 to compute the acoustic target classification 290.

Figure 16:
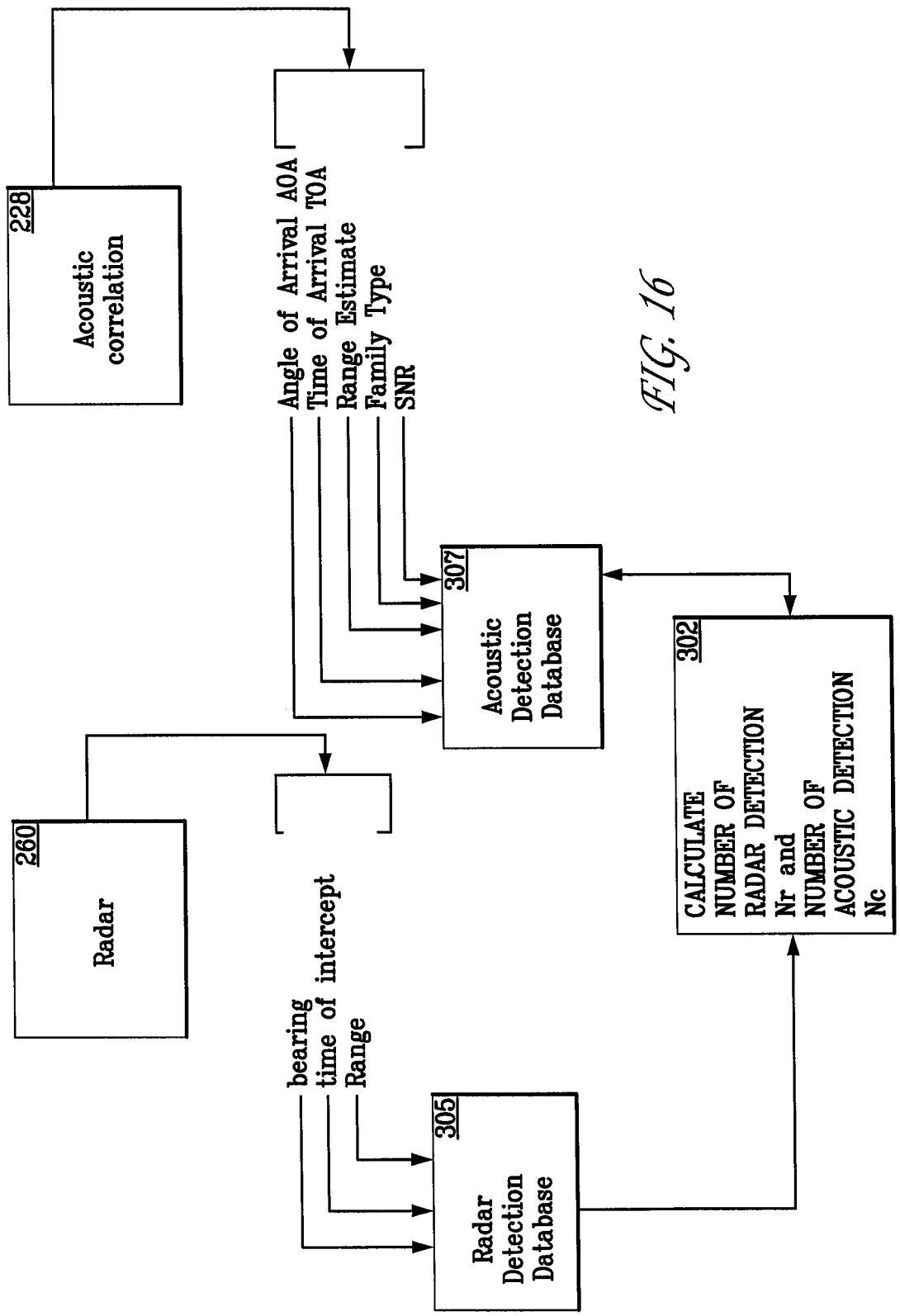
FIG. 16 illustrates radar and acoustic data bases that store detection data in accordance with the present invention.

As shown in FIG. 16 the acoustic correlation module 228 stores range, angle of arrival (AOA), time of arrival (TOA), family type of armament and SNR in database 307. The radar system 250 stores bearing, time of intercept (TOI) and range in database 305. A process 302 computes the number of radar detections $n_r$ and the number of acoustic detections $n_c$ for use in an association algorithm described in connection with FIG. 17.

Figure 17:
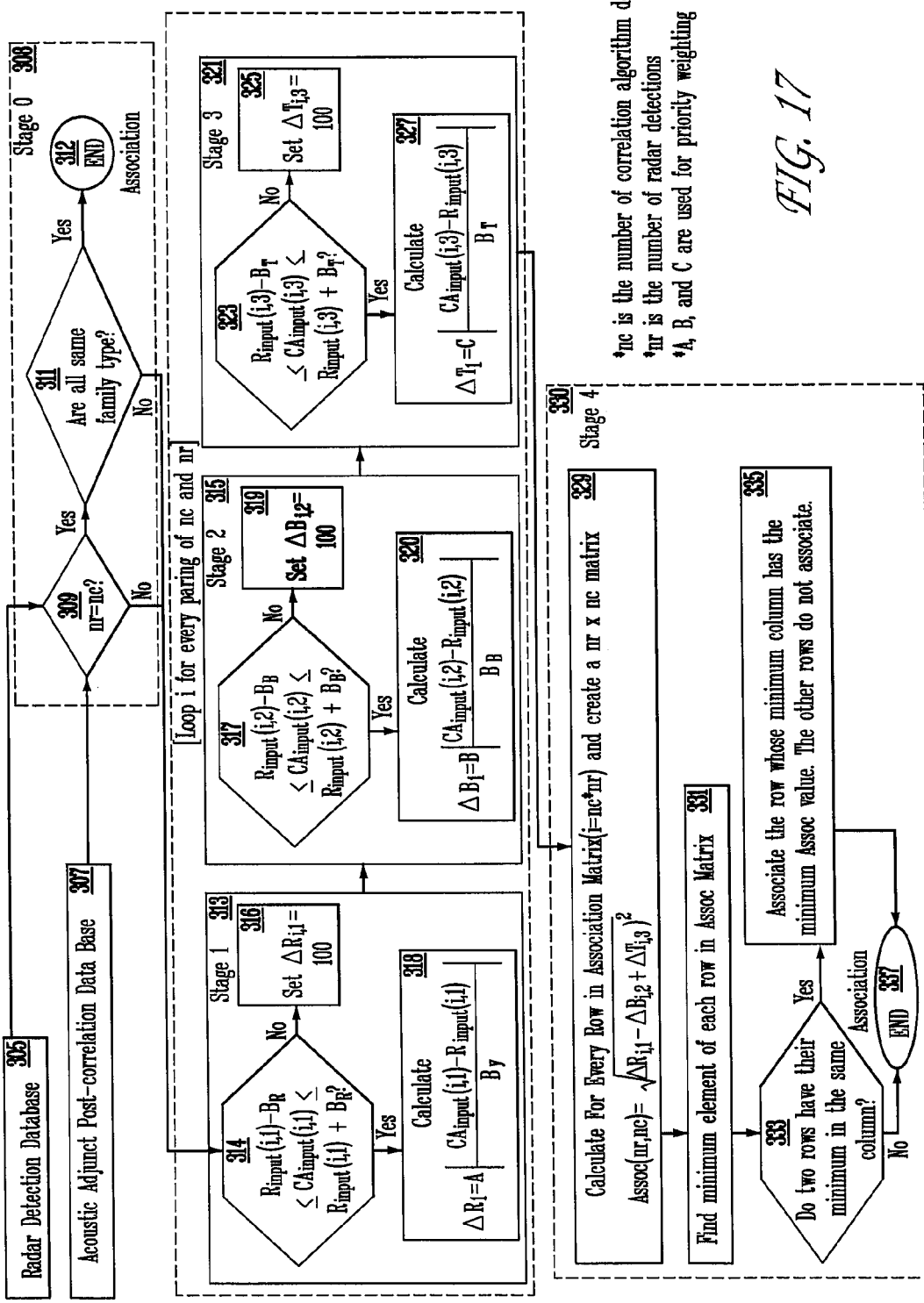
FIG. 17 is a flow chart illustrating the process of computing the associations between radar detections and acoustic detections of potential targets in accordance with the present invention.

The process illustrated in FIG. 17 utilizes data provided by blocks 250, 260, 272, 274, and 276 of FIG. 14. FIG. 16 radar detection database 305 data and the acoustic adjunct post-correlation data base 307 data are used to complete the classification of the targets based upon radar and acoustic associations. In a stage zero (0) 308, block 309 determines if the number $n_r$ of number of radar system 250 detections equals the number $n_c$ of acoustic system 260 detections. If $n_r \neq n_c$ then processing proceeds to stage 1 313.

If $n_r = n_c$ then decision block 311 tests if the detections associated with $n_c$ are all from the same family type. If the detections from the acoustic system 260 are from the same family type then further processing is ended 312 and an association is considered as having been made.

If the detections from the acoustic system 260 are not from the same family type then processing to determine the classification proceeds to stage 1 at block 313. Block 314 calculates whether the range data CA for the acoustically detected target (i, 1) is between the corresponding range data R (i, 1) plus or minus the range window $B_R$ for the detected target (i, 1). If CA for the acoustically detected target (i, 1) is not between the corresponding range data R(i, 1) plus or minus the range window $B_R$ for the radar range detected target R(i, 1) then in block 316 a variable $\Delta R(i,1)$ is set to an arbitrarily large value, which in the present example is 100. If CA for the acoustically detected target (i, 1) is between the corresponding range data R(i, 1) plus or minus the range window $B_R$ for the radar range detected target R(i, 1) then in block 318 the variable $\Delta R(i,1)$ is calculated using the formula shown in block 318, where A is a value chosen to weigh the variable for salience in a subsequent calculation that determines the classification 290.

If the detections from the acoustic system 260 are not from the same family type then following the calculation of $\Delta R(i,1)$ in stage 1 at block 313, a stage 2 block 315 calculates at block 317 whether the bearing data CA for the acoustically detected target (i, 2) is between the corresponding bearing data R(i, 2) plus or minus the range window $B_B$ for the radar detected target (i, 2). If CA for the acoustically detected target (i, 1) is not between the corresponding bearing data R(i, 2) plus or minus the range window $B_B$ for the radar detected target R(i, 2) then at block 319 a variable $\Delta B(i,2)$ is set to an arbitrarily large value, which in the present example is 100. If CA for the acoustically detected target (i, 2) is between the corresponding bearing data R(i, 2) plus or minus the range window $B_B$ for the radar range detected target R(i, 2) then in block 320 the variable $\Delta B(i,2)$ is calculated using the formula shown in block 320, where B is a value chosen to weigh the variable for salience in a subsequent calculation that determines the classification 290.

If the detections from the acoustic system 260 are not from the same family type then following the calculation of $\Delta R(i,2)$ in stage 2 at block 315 stage 3 block 321 calculates at block 323 whether the Time of Arrival or TOA data for CA the acoustically detected target (i, 3) is between the corresponding bearing data R(i, 3) plus or minus the range window $B_T$ for the radar detected target (i, 3). If CA for the acoustically detected target (i, 3) is not between the corresponding range data R(i, 3) plus or minus the range window $B_T$ for the radar detected target R(i, 3) then at block 325 a variable $\Delta T(i,3)$ is set to an arbitrarily large value, which in the present example is 100. If CA for the acoustically detected target (i, 3) is between the corresponding TOA data R(i, 3) plus or minus the range window $B_T$ for the radar range detected target R(i, 3) then in block 327 the variable $\Delta T(i,3)$ is calculated using the formula shown in block 327, where C is a value chosen to weigh the variable for salience in a subsequent calculation that determines the classification 290.s Following the calculation of $\Delta T(i,3)$ stage 3 Block 321, a stage 4 block 330 calculates a metric forming an association matrix Assoc($n_r$, $n_c$) using the formula in block 329. Following the creation of the matrix Assoc($n_r$, $n_c$) block 331 finds the minimum element in each row in the Assoc($n_r$, $n_c$). A test 333 determines if two rows have their minimum in the same column and if "yes" then associate the row whose minimum column has the minimum association value. If two rows do not have their minimum in the same column, then an association 335 is established and the process is ended 337.

Figure 18A:
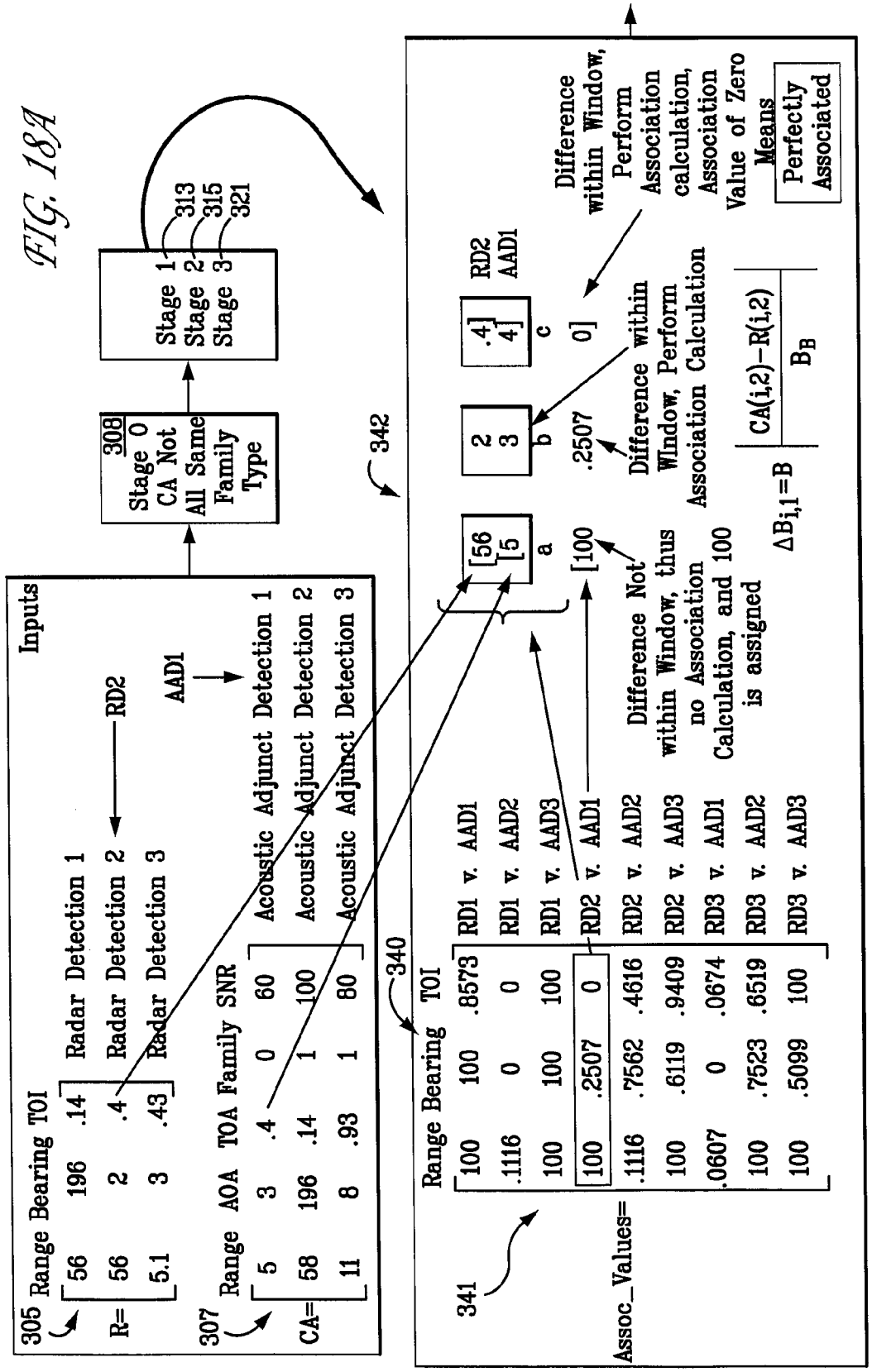
FIG. 18a is a flow chart illustrating an example of the process of computing the associations between radar detections and acoustic detections of potential targets in accordance with the present invention.
Figure 18B:
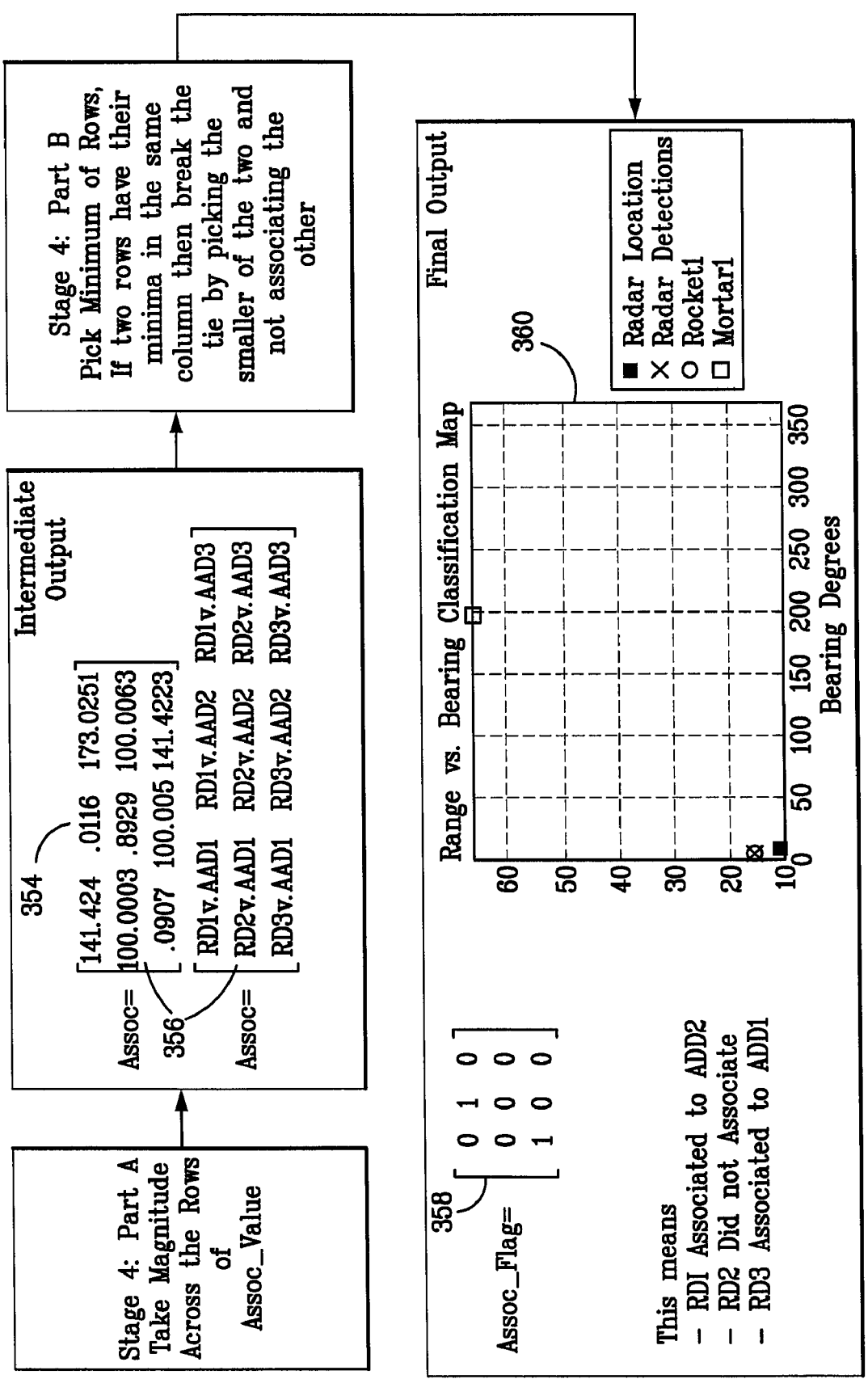
FIG. 18b is a flow chart illustrating an example of the process of computing the associations between radar detec-

FIG. 18a and FIG. 18b illustrate the algorithms utilized in FIG. 17. Input matrix R 305 shows a set of hypothetical values for the radar detections 1, 2 and 3. Input matrix CA 307 shows a set of hypothetical values for the acoustic adjunct detections 1, 2 and 3. Note in the example that the family in detection 1 differs from the family in detections 2 and 3. The inputs are subjected to the logic previously detailed in stage zero (0) 308, where in the example the acoustic system 260 detections are not from the same family, in which case processing proceeds to stage 313, 315 and 321. Matrix 340 represents data stored in a database (not shown) from stages 1, 2 and 3 where Range, Bearing and TOI represent $\Delta R(i,1)$, $\Delta B(i,2)$ and $\Delta T(i,3)$ respectively, as calculated using the formula shown in blocks 318, 320 and 327 (FIG. 17).

Referring to FIG. 17 and FIG. 18*a* values in the matrix 340 shown as row 341 were derived as indicated from the formula shown in blocks 318, 320 and 327 (FIG. 17). The row represents the comparison between radar detection 2 RD2 shown in the input R matrix stored in database 305 (FIGS. 16, 17) and the acoustic adjunct detection 1 AAD1 shown in the input CA matrix stored in database 307 (FIGS. 16, 17). This is highlighted in box 342*a*, *b*, and *c*.

Referring to FIG. 17 and FIG. 18*b*, outputs from stages 1, 2 and 3 represented by $\Delta R(i,1)$, $\Delta B(i,2)$ and $\Delta T(i,3)$ are used in the formula indicated in block 329 to create the matrix Assoc($n_r$, $n_c$) 354. In the example shown, the values in the matrix 340 row 341 of FIG. 18*a* produce 356 the values in Assoc(2,1) 354 of 100.003.

In accordance with the rule previously established, if two rows have their minimum in the same column (such as Assoc (1,2) 354 of value 0.116 and Assoc(2,2) 354 of value 0.8929) then associate the row whose minimum column has the minimum association value in a matrix Assoc_Flag (1,2) 358, by inserting the value 1. If two rows do not have their minimum in the same column (such as (such as Assoc(3,1) 354 of value 0.0907, then in a matrix Assoc_Flag (3,1) 358 insert the value 1 to show that an association exists.

The classification 290 is shown in final output 360 (FIG. 18*b*) where the matrix Assoc_Flag (1,2) 358, and Assoc_Flag (3,1) 358 support FIG. 18*a* input matrix R stored in database 305 that shows set of hypothetical values for the radar detections 1, 2 and 3 and corresponding input matrix CA stored in database 307 hypothetical values for the acoustic adjunct detections 1, 2 and 3.

The processors utilized in the radar system 250 and the acoustic system 260, such as processor 210, 228, 208 and the associated memory, operating system and databases such as 230, 305, 307 with functionality selection capabilities can be implemented in software, hardware, firmware, or a combination thereof. In a preferred embodiment, the associated systems 250, 260 and processors such as 210, 228, 208 functionality selection is implemented in software stored in the memory. It is to be appreciated that, where the functionality selection is implemented in either software, firmware, or both, the processing instructions can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions.

Further, it is understood that the subject invention may reside in the program storage medium that constrains operation of the associated systems, 250, 260 and other processors such as 210, 228, 208, and in the method steps that are undertaken by cooperative operation of the processor(s) on the messages within the communications network. These processes may exist in a variety of forms having elements that are more or less active or passive. For example, they exist as software program(s) comprised of program instructions in source code or object code, executable code or other formats. Any of the above may be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), flash memory, and magnetic or optical disks or tapes. Exemplary computer readable signals, whether modulated using a carrier or not, are signals that a computer system hosting or running the computer program may be configured to access, including signals downloaded through the Internet or other networks. Examples of the foregoing include distribution of the program(s) on a CD ROM or via Internet download.

The same is true of computer networks in general. In the form of processes and apparatus implemented by digital processors, the associated programming medium and computer program code is loaded into and executed by a processor, or may be referenced by a processor that is otherwise programmed, so as to constrain operations of the processor and/or other peripheral elements that cooperate with the processor. Due to such programming, the processor or computer becomes an apparatus that practices the method of the invention as well as an embodiment thereof. When implemented on a general-purpose processor, the computer program code segments configure the processor to create specific logic circuits. Such variations in the nature of the program carrying medium, and in the different configurations by which computational and control and switching elements can be coupled operationally, are all within the scope of the present invention.

The present invention finds application in various radar array systems and subsystems, including, for example, CTA-type radar systems that provide or require simultaneous long and short range capabilities. While the present invention has been described with reference to the illustrative embodiments, this description is not intended to be construed in a limiting sense. Various modifications of the illustrative embodiments, as well as other embodiments of the invention, will be apparent to those skilled in the art on reference to this description. It is therefore contemplated that the appended claims will cover any such modifications or embodiments as fall within the true scope of the invention.

What is claimed is:

1. A system for classifying targets comprising:
a radar system for detecting targets based upon radar receptions; an acoustic system for detecting targets based upon acoustic receptions; a means for classifying the acoustic receptions into target types; a means for computing range, bearing and time of incidence for the radar receptions and the acoustic receptions; and a means for associating the radar receptions and the acoustic receptions according to the classification; a processing means for determining differences between the radar receptions and the acoustic receptions and creating an association matrix based on the differences.

2. The system of claim 1, wherein the acoustic system for detecting targets based upon acoustic receptions includes a database of acoustic signatures.

3. The system of claim 1, wherein the acoustic system has an aperture and associated sensor for directionally receiving sonic waves.

4. The system of claim 3, wherein the sonic waves are converted into electrical signals for matching the signals to acoustic signatures.

5. The system of claim 4, wherein the electrical signals are converted to digital signals.

6. The system of claim 4, wherein the digital signal is processed by an acoustic beamformer.

7. The system of claim 6, wherein the beamformer provides for phase shifts to each element of the acoustic aperture.

8. The system of claim 4, wherein the signal provides data to estimate the bearing from which a sonic wave is received by the acoustic aperture.

9. The system of claim 3, wherein the range of the target emitting a sonic wave is estimated based on the signal intensity at receiver aperture.

10. The system of claim 5, wherein a correlation means performs a correlation on the signal and the stored acoustic signatures to determine the type of incoming target.

11. The system of claim 4, wherein the signal to noise ratio of the received acoustic signal determines a window of time associated with range and bearing calculations.

12. A method for classifying targets comprises the step of associating one or more radar receptions and one or more acoustic receptions according to a classification of the acoustic receptions and the respective range, bearing and time of incidence for the radar receptions and the acoustic receptions; and creating an association matrix based upon the difference between the acoustic receptions and corresponding radar receptions.

13. The method of claim 12, further including detecting targets based upon radar receptions; detecting targets based upon acoustic receptions; classifying the acoustic receptions into target types; computing range, bearing and time of incidence for the radar receptions and the acoustic reception.

14. The method of claim 12, wherein the step of associating the radar receptions further includes the step of determining if the acoustic receptions are from the same type of target.

15. The method of claim 12, wherein the step of associating the radar receptions further includes the step of determining if the range of the acoustic receptions are within a window of a corresponding radar receptions.

16. The method of claim 12, wherein the step of associating the radar receptions further includes the step of determining if the bearing of the acoustic receptions are within a window of a corresponding radar receptions.

17. The method of claim 12, wherein the step of associating the radar receptions further includes the step of determining if the bearing of the acoustic receptions are within a window of a corresponding radar receptions.

18. The method of claim 12, wherein the step of associating the radar receptions further includes the step of determining if the time of arrival of the acoustic receptions are within a window of a corresponding radar receptions.

19. The method of claim 12, wherein the step of associating the radar receptions further includes the step of creating an association matrix based upon the difference between the range of the acoustic receptions and corresponding radar receptions.

20. The method of claim 12, wherein the step of associating the radar receptions further includes the step of creating an association matrix based upon the difference between the bearing of the acoustic receptions and corresponding radar receptions.

21. The method of claim 12, wherein the step of associating the radar receptions further includes the step of creating an association matrix based upon the difference between the time of arrival of the acoustic receptions and corresponding radar receptions.

22. The method of claim 12, wherein the step of associating the radar receptions further includes the step of determining from an association matrix if two rows have a minimum in the same column.

23. The method of claim 12, wherein the step of associating targets based upon acoustic receptions includes the step of accessing a database of acoustic signatures of armament projectiles.

24. The method of claim 13, wherein the step of detecting targets based upon acoustic receptions includes directionally receiving sonic waves.

25. The method of claim 13, wherein the step of classifying the acoustic receptions into target types further includes the step of computing range, bearing and time of incidence for the radar receptions.

26. The method of claim 13, wherein the step of classifying the acoustic receptions into target types further includes the step of matching the signals to acoustic signatures stored in a database.

27. The method of claim 13, wherein the step of classifying the acoustic receptions into target types further includes the step of processing by an acoustic beamformer.

28. The method of claim 13, wherein the step of classifying the acoustic receptions into target types further includes the step of correlating the received signal and the stored acoustic signatures to determine the type of incoming target.

29. The method of claim 13, wherein the step of classifying the acoustic receptions into target types further includes the step of using the signal to noise ratio of the received acoustic signal to determine a window of time associated with range and bearing calculations.

30. The method of claim 13, wherein the step of classifying the acoustic receptions into target types further includes the step of applying an amplitude taper in accordance with a Taylor function to the beamformer.

31. A system for classifying targets comprising:
a radar system for detecting targets based upon radar receptions;
an acoustic system for detecting targets based upon acoustic receptions;
a processor configured to classify the acoustic receptions into target types; compute range, bearing and time of incidence for the radar receptions and the acoustic receptions; associate the radar receptions and the acoustic receptions according to the classification; and determine differences between the radar receptions and the acoustic receptions and generate an association matrix based on the differences.

32. The system of claim 31, wherein the processor is further configured to associate the radar receptions by generating an association matrix based upon the difference between range of the acoustic receptions, and the corresponding radar receptions.

33. The system of claim 31, wherein the processor is further configured to associate the radar receptions by generating an association matrix based upon the difference between bearing of the acoustic receptions, and the corresponding radar receptions.

34. The system of claim 31, wherein the processor is further configured to associate the radar receptions by generating an association matrix based upon the difference between time of arrival of the acoustic receptions, and the corresponding radar receptions.

* * * * *